US011008244B2

(12) United States Patent
Abramov

(10) Patent No.: US 11,008,244 B2
(45) Date of Patent: May 18, 2021

(54) METHODS OF SEPARATING A GLASS WEB

(71) Applicant: Corning Incorporated, Corning, NY (US)

(72) Inventor: Anatoli Anatolyevich Abramov, Painted Post, NY (US)

(73) Assignee: CORNING INCORPORATED, Corning, NY (US)

(*) Notice: Subject to any disclaimer, the term of this patent is extended or adjusted under 35 U.S.C. 154(b) by 201 days.

(21) Appl. No.: 15/777,491

(22) PCT Filed: Nov. 22, 2016

(86) PCT No.: PCT/US2016/063224
§ 371 (c)(1),
(2) Date: May 18, 2018

(87) PCT Pub. No.: WO2017/091529
PCT Pub. Date: Jun. 1, 2017

(65) Prior Publication Data
US 2018/0346369 A1 Dec. 6, 2018

Related U.S. Application Data

(60) Provisional application No. 62/259,770, filed on Nov. 25, 2015.

(51) Int. Cl.
C03B 33/09 (2006.01)
C03B 33/02 (2006.01)
(Continued)

(52) U.S. Cl.
CPC ........ *C03B 33/093* (2013.01); *B23K 26/0846* (2013.01); *B23K 26/359* (2015.10);
(Continued)

(58) Field of Classification Search
CPC . C03B 33/091; C03B 33/093; C03B 33/0222; C03B 33/082
See application file for complete search history.

(56) References Cited

U.S. PATENT DOCUMENTS 4,562,333 A 12/1985 Taub et al.
5,132,505 A 7/1992 Zonneveld et al.
(Continued)

FOREIGN PATENT DOCUMENTS

CN 102167505 A 8/2011
CN 104237997 A 12/2014
(Continued)

OTHER PUBLICATIONS

International Search Report and Written Opinion of the International Searching Authority; PCT/US2016/063224; dated Mar. 13, 2017; 15 Pages; Korean Patent Office.
(Continued)

*Primary Examiner* — Erin Snelting

(57) ABSTRACT

Methods of separating a glass web that is moving at a glass web velocity. The method includes exposing a separation path on the glass web to at least one laser beam spot that moves with a laser beam spot velocity vector that is equal to a glass web velocity vector in a conveyance direction. The method also includes creating a defect on the separation path while the separation path is under thermal stress from the laser beam spot, whereupon the glass web spontaneously separates along the separation path in response to the defect. In further examples, a glass web separation apparatus includes a first reflector that rotates such that a laser beam spot repeatedly passes along a separation path and a second reflector that rotates such that the laser beam spot moves in a conveyance direction of the glass web.

15 Claims, 15 Drawing Sheets

(51) Int. Cl.
  *B23K 26/08* (2014.01)
  *B23K 26/359* (2014.01)
  *B28D 5/00* (2006.01)
  *B28D 1/22* (2006.01)
  *B23K 103/00* (2006.01)

(52) U.S. Cl.
  CPC ............... *B28D 1/221* (2013.01); *B28D 5/00* (2013.01); *C03B 33/0215* (2013.01); *C03B 33/091* (2013.01); *B23K 2103/54* (2018.08); *B28D 1/225* (2013.01)

(56) References Cited

U.S. PATENT DOCUMENTS

| | | | |
|---|---|---|---|
| 5,254,833 A | 10/1993 | Okiyama | |
| 5,984,159 A * | 11/1999 | Ostendarp | B23K 26/073 |
| | | | 225/93.5 |
| 6,130,401 A * | 10/2000 | Yoo | B23K 26/18 |
| | | | 219/121.6 |
| 8,051,679 B2 | 11/2011 | Abramov et al. | |
| 8,347,651 B2 | 1/2013 | Abramov et al. | |
| 8,372,666 B2 | 2/2013 | Crawford et al. | |
| 8,539,795 B2 | 9/2013 | Dannoux et al. | |
| 8,932,510 B2 | 1/2015 | Li et al. | |
| 2002/0006765 A1* | 1/2002 | Michel | B23K 26/359 |
| | | | 451/28 |
| 2006/0081101 A1* | 4/2006 | Hayashi | C03B 33/093 |
| | | | 83/15 |
| 2007/0169849 A1* | 7/2007 | Yahagi | C03B 33/091 |
| | | | 144/366 |
| 2008/0264994 A1 | 10/2008 | Herve et al. | |
| 2010/0326138 A1* | 12/2010 | Kumatani | C03B 33/023 |
| | | | 65/286 |
| 2011/0017713 A1* | 1/2011 | Abramov | C03B 33/0215 |
| | | | 219/121.67 |
| 2011/0049765 A1* | 3/2011 | Li | C03B 33/091 |
| | | | 264/400 |
| 2011/0113830 A1 | 5/2011 | Abramov et al. | |
| 2011/0177325 A1 | 7/2011 | Tomamoto et al. | |
| 2011/0192878 A1 | 8/2011 | Teranishi et al. | |
| 2011/0266261 A1* | 11/2011 | Nakano | B23K 26/53 |
| | | | 219/121.6 |
| 2013/0068737 A1 | 3/2013 | Saito | |
| 2013/0133367 A1 | 5/2013 | Abramov et al. | |
| 2014/0319001 A1 | 10/2014 | Tomamoto et al. | |
| 2015/0059411 A1* | 3/2015 | Lim | B23K 26/0643 |
| | | | 65/112 |
| 2016/0016746 A1 | 1/2016 | Mitsugi et al. | |
| 2016/0136846 A1 | 5/2016 | Abramov et al. | |

FOREIGN PATENT DOCUMENTS

| | | | | |
|---|---|---|---|---|
| EP | 1721872 A1 * | 11/2006 | | C03B 33/091 |
| JP | 2002-346775 A | 12/2002 | | |
| JP | 2003-133253 A | 5/2003 | | |
| JP | 2003-290960 A | 10/2003 | | |
| JP | 2010-132348 A | 6/2010 | | |
| JP | 2010-526014 A | 7/2010 | | |
| JP | 2011011212 A | 1/2011 | | |
| JP | 2013-116488 A | 6/2013 | | |
| JP | 2014-161899 A | 9/2014 | | |
| KR | 20040020605 A | 3/2004 | | |
| KR | 918124 B1 | 9/2009 | | |
| TW | 200906747 A | 2/2009 | | |
| WO | 2008/133800 A1 | 11/2008 | | |
| WO | 2010007953 A1 | 1/2010 | | |
| WO | 2011/142464 A1 | 11/2011 | | |
| WO | 2013108568 A1 | 7/2013 | | |
| WO | 2014029833 A1 | 12/2014 | | |

OTHER PUBLICATIONS

First Office Action received for CN App. No. 2016800692211, dated Aug. 3, 2020, 27 pages (15 pages of English Translation and 12 pages of Original Document).

Search Report received for TW App. No. 105138582, dated Aug. 14, 2020, 1 page (English Translation Only).

Japanese Patent Application No. 2018-526864 Notice of Reasons for Refusal dated Dec. 2, 2020; 6 Pages; (3 Pages of English Translation and 3 Pages of Original Document) Japanese Patent Office.

* cited by examiner

METHODS OF SEPARATING A GLASS WEB

This application claims the benefit of priority under 35 U.S.C. § 371 of International Application No. PCT/US2016/063224, filed on Nov. 22, 2016, which claims the benefit of priority under 35 U.S.C. § 119 of U.S. Provisional Application Ser. No. 62/259,770, filed on Nov. 25, 2015, the content of which is relied upon and incorporated herein by reference in its entirety.

FIELD

The present disclosure relates generally to methods of separating a glass web and, more particularly, to methods of separating a glass web by creating a defect on a separation path under thermal stress, whereupon the glass web spontaneously separates along the separation path in response to the defect.

BACKGROUND

It is known to separate a glass ribbon to achieve a glass sheet with the desired dimensions. Conventional separation techniques achieve separation while the glass ribbon is moving, thereby avoiding uninterrupted traversing of the glass ribbon along a travel direction while separating the glass sheet from the glass ribbon.

SUMMARY

The following presents a simplified summary of the disclosure to provide a basic understanding of some embodiments described in the detailed description.

In accordance with some embodiments, a method of separating a glass web comprises the step (I) of moving the glass web at a glass web velocity including a glass web velocity vector in a conveyance direction of the moving glass web. The method further includes the step (II) of exposing a separation path on the glass web to at least one laser beam spot to produce thermal stress along the separation path, the separation path extending in a direction transverse to the conveyance direction. The method still further includes the step (III) of moving the laser beam spot at a laser beam spot velocity including a laser beam spot velocity vector in the conveyance direction that is equal to the glass web velocity vector. The separation path continues to be exposed to the laser beam spot to continue producing thermal stress along the separation path while the glass web moves at the glass web velocity. The method also includes the step (IV) of creating a defect on the separation path while the separation path is under thermal stress produced during steps (II) and (III), whereupon the glass web separates along the separation path in response to creating the defect.

In one embodiment, step (III) includes reflecting at least one laser beam off a rotating reflective surface to cause the laser beam spot to move at the laser beam spot velocity vector.

In another embodiment, the method further includes repeatedly passing the laser beam spot along the separation path in the direction transverse to the conveyance direction to produce the thermal stress along the separation path during steps (II) and (III).

In another embodiment, the laser beam spot velocity of step (III) includes another laser beam spot velocity vector in the direction transverse to the conveyance direction. The laser beam spot moves in the conveyance direction and the direction transverse to the conveyance direction such that the separation path continues to be exposed to the laser beam spot to continue producing thermal stress along the separation path while the glass web moves at the glass web velocity and while the laser beam spot continues to repeatedly pass along the separation path in the direction transverse to the conveyance direction.

In another embodiment, step (III) includes reflecting at least one laser beam off a first reflective surface rotating about a first axis to cause the laser beam spot to repeatedly pass along the separation path in the direction transverse to the conveyance direction. Step (III) further includes reflecting the at least one laser beam off a second reflective surface rotating about a second axis to cause the laser beam spot to move at the laser beam velocity vector in the conveyance direction of the glass web.

In another embodiment, the at least one laser beam reflects off the first reflective surface before the second reflective surface.

In another embodiment, the at least one laser beam reflects off the second reflective surface before the first reflective surface.

In another embodiment, the first axis is perpendicular to the second axis.

In another embodiment, the step of repeatedly passing the beam spot includes repeatedly passing the beam spot in a single direction transverse to the conveyance direction.

In another embodiment, the single direction comprises a direction extending from the first edge toward the second edge of the glass web, and wherein the defect is created closer to the first edge than the second edge.

In another embodiment, step (IV) is performed while step (III) is performed.

In another embodiment, step (IV) is performed after a predetermined level of thermal stress is achieved along the separation path during step (III).

In another embodiment, the at least one laser beam spot of step (I) comprises a plurality of laser beam spots that each produce thermal stress along a corresponding segment of the separation path during steps (II) and (III).

In another embodiment, each segment of the separation path overlaps a portion of at least one adjacent segment of the separation path.

In another embodiment, the defect of step (IV) is created with a laser or by mechanically engaging the glass web.

In another embodiment, the glass web includes a length and a width extending between a first edge and a second edge of the glass web, and the conveyance direction is a direction of the length of the glass web.

In another embodiment, the glass web comprises a glass ribbon drawn from a forming body, and the conveyance direction is a draw direction of the glass ribbon.

In accordance with other embodiments, an apparatus for separating a glass web includes at least one laser beam generator, a first reflector and a second reflector. The first reflector includes a first reflective surface rotatable about a first axis. The laser beam generator is aligned with the first reflector such that a laser beam produced by the at least one laser beam generator will produce a laser beam spot that repeatedly passes along a separation path on the glass web when the first reflector is rotated. The second reflector includes a second reflective surface rotatable about a second axis. The second reflector is aligned with the first reflector such that the laser beam spot will move in a conveyance direction of the glass web when the second reflector is rotated. The first reflector is positioned upstream from the second reflector such that the laser beam produced by the laser beam generator reflects off the first reflective surface of the first reflector prior to reflecting off the second reflective surface of the second reflector.

In one embodiment, the first axis is perpendicular to the second axis.

In another embodiment, the at least one laser beam generator is configured to produce a plurality of laser beam spots that each produce thermal stress along a corresponding segment of the separation path.

In accordance with other embodiments, an apparatus for separating a glass web includes at least one laser beam generator, a first reflector and a second reflector. The second reflector includes a second reflective surface rotatable about a second axis. The laser beam generator is aligned with the second reflector such that a laser beam produced by the at least one laser beam generator will produce a laser beam spot that will move in a conveyance direction of the glass web when the second reflector is rotated. The first reflector includes a first reflective surface rotatable about a first axis. The first reflector is aligned with the second reflector such that the laser beam spot produced by the at least one laser beam will repeatedly pass along a separation path on the glass web when the first reflector is rotated. The second reflector is positioned upstream from the first reflector such that the laser beam produced by the laser beam generator will reflect off the second reflective surface of the second reflector prior to reflecting off the first reflective surface of the first reflector.

In one embodiment, the first axis is perpendicular to the second axis.

In another embodiment, the at least one laser beam generator is configured to produce a plurality of laser beam spots that each produce thermal stress along a corresponding segment of the separation path.

In accordance with other embodiments, a method of separating a glass web comprising the step (I) of moving the glass web in a conveyance direction and the step (II) of exposing a separation path on the glass web to at least one laser beam spot to produce thermal stress along the separation path, the separation path extending in a direction transverse to the conveyance direction. The method further includes the step (III) of creating a defect on the separation path while the separation path is under thermal stress produced during step (II), whereupon the glass web separates along the separation path in response to creating the defect.

BRIEF DESCRIPTION OF THE DRAWINGS

These and other features, aspects and advantages of the present disclosure are better understood when the following detailed description is read with reference to the accompanying drawings, in which.

DETAILED DESCRIPTION

Figure 1:
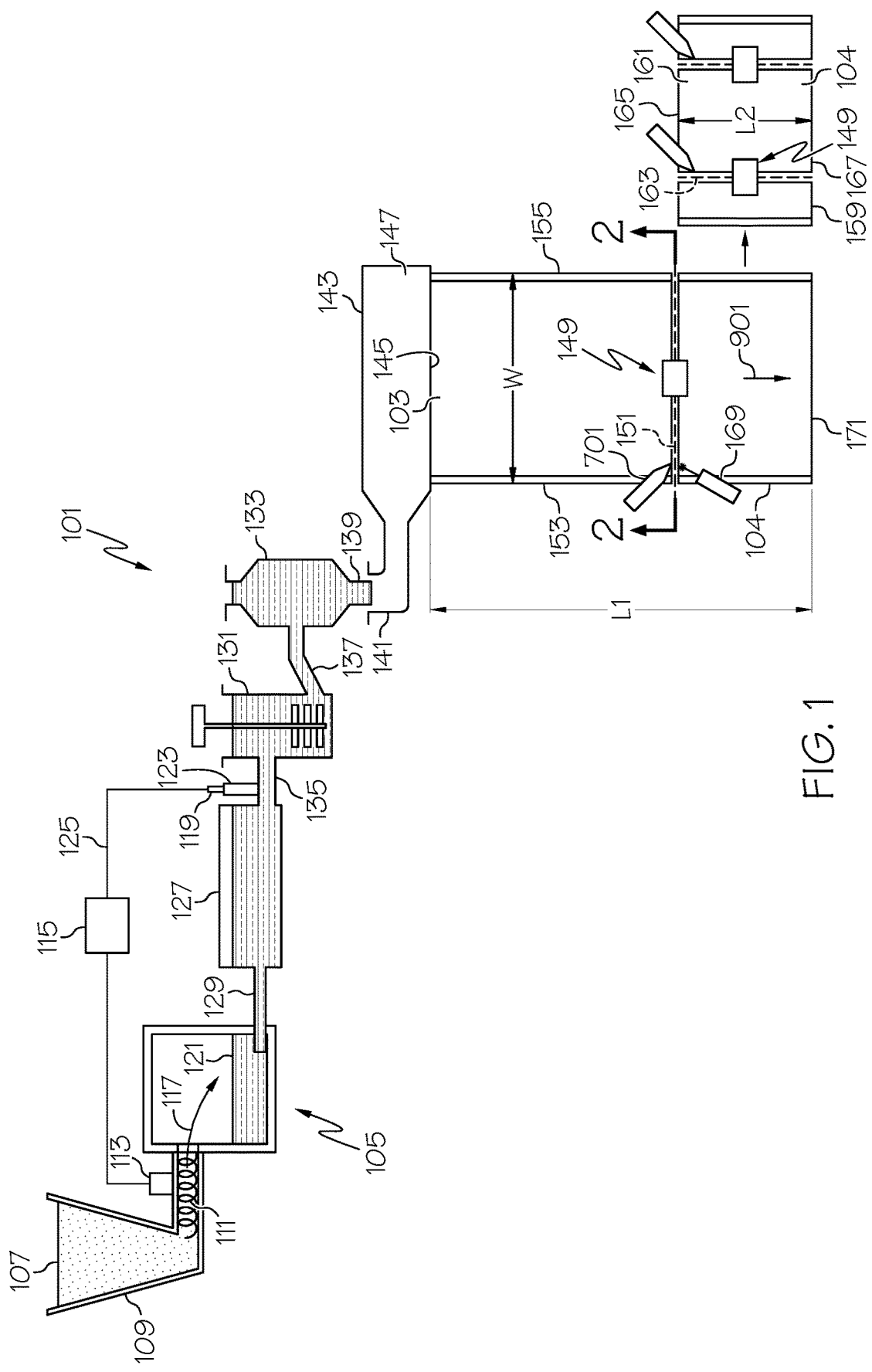
FIG. 1 is a schematic view of a fusion down-draw apparatus configured to draw a glass ribbon and exemplary glass ribbon separating apparatus.

Apparatus and methods will now be described more fully hereinafter with reference to the accompanying drawings in which exemplary embodiments of the disclosure are shown. Whenever possible, the same reference numerals are used throughout the drawings to refer to the same or like parts. However, this disclosure may be embodied in many different forms and should not be construed as limited to the embodiments set forth herein.

It is to be understood that specific embodiments disclosed herein are intended to be exemplary and therefore non-limiting. As such, the present disclosure relates to methods and apparatus for separating a glass web. In some embodiments, the glass web can include a glass ribbon formed from any glass forming process or glass manufacturing process. The glass ribbon can be provided directly from a glass forming apparatus or glass manufacturing apparatus, can be provided as a spool of glass ribbon that can be rolled or coiled onto a core, or can be provided as a freestanding glass ribbon. In other embodiments, the glass web can include a glass sheet formed by any glass forming process or glass manufacturing process. The glass sheet can be provided as a glass sheet separated from a glass ribbon, as a glass sheet separated from another glass sheet, as one or more glass sheets provided as a spool of one or more glass sheets rolled or coiled onto a core, as a stack of glass sheets, or as a freestanding glass sheet.

The glass web can be separated in accordance with the embodiments disclosed herein to form one or more additional glass webs. In some embodiments, the one or more additional glass webs separated from the glass web can include a glass ribbon. The glass ribbon can be separated from a glass ribbon provided directly from a glass forming apparatus or glass manufacturing apparatus, can be separated from a glass ribbon provided as a spool of glass ribbon that can be rolled or coiled onto a core, or can be separated from a glass ribbon provided as a freestanding glass ribbon. In other embodiments, the one or more additional glass webs separated from the glass web can include a glass sheet. The glass sheet can be separated from a glass ribbon provided directly from a glass forming apparatus or glass manufacturing apparatus, can be separated from a glass ribbon provided as a spool of glass ribbon that can be rolled or coiled onto a core, or can be separated from a glass ribbon provided as a freestanding glass ribbon. In still other embodiments, the glass sheet can be separated from a glass sheet provided as a glass sheet separated from a glass ribbon, can be separated from a glass sheet provided as a glass sheet separated from another glass sheet, can be separated from a glass sheet provided as a spool of one or more glass sheets rolled or coiled onto a core, can be separated from a glass sheet provided as a stack of glass sheets, or can be separated from a glass sheet provided as a freestanding glass sheet.

In further examples the glass web may be separated to remove an edge portion from a remainder of the glass web. For instance, the edge portion may be discarded or further processed in additional applications.

Glass sheets separated from the glass web can be suitable for further processing into a desired display application. The glass sheets can be used in a wide range of display applications, including liquid crystal displays (LCDs), electrophoretic displays (EPD), organic light emitting diode displays (OLEDs), plasma display panels (PDPs), or the like. Glass sheets may need to be transported from one location to another. The glass sheets may be transported with a conventional support frame designed to secure a stack of glass sheets in place. Moreover, interleaf material can be placed between each sheet of glass to help prevent contact and therefore preserve the pristine surfaces of the glass sheets.

Some embodiments will now be described wherein the glass web to be separated comprises a glass ribbon although apparatus and methods of the disclosure are not so limiting. Indeed, apparatus and methods of the disclosure can be used to separate any one of a variety of glass webs, such as the glass webs discussed above.

In some embodiments, methods of separating a glass web comprising a glass ribbon may be used in conjunction with a glass manufacturing apparatus configured to fabricate the glass ribbon although other glass processing apparatus may be provided in further embodiments. In some embodiments, the glass manufacturing apparatus can comprise a slot draw apparatus, float bath apparatus, down-draw apparatus, up-draw apparatus, press-rolling apparatus or other glass ribbon manufacturing apparatus. By way of example, FIG. 1 schematically illustrates an apparatus for processing a quantity of glass melt comprising a fusion down-draw apparatus 101 for fusion drawing a glass ribbon 103 for subsequent separation, for example, separation into another glass web such as the illustrated glass sheet 104. The fusion down-draw apparatus 101 can include a melting vessel 105 that receives batch material 107 from a storage bin 109. The batch material 107 can be introduced by a batch delivery device 111 powered by a motor 113. An optional controller 115 can be used to activate the motor 113 to introduce a desired amount of batch material 107 into the melting vessel 105, as indicated by arrow 117. A glass melt probe 119 can be used to measure a glass melt 121 level within a standpipe 123 and communicate the measured information to the controller 115 by way of a communication line 125.

The fusion down-draw apparatus 101 can also include a first conditioning station such as a fining vessel 127 located downstream from the melting vessel 105 and coupled to the melting vessel 105 by way of a first connecting conduit 129. In some embodiments, glass melt may be gravity fed from the melting vessel 105 to the fining vessel 127 by way of the first connecting conduit 129. For instance, gravity may act to drive the glass melt to pass through an interior pathway of the first connecting conduit 129 from the melting vessel 105 to the fining vessel 127. Within the fining vessel 127, bubbles may be removed from the glass melt by various techniques.

The fusion draw apparatus can further include a second conditioning station such as a glass melt mixing vessel 131 that may be located downstream from the fining vessel 127. The glass melt mixing vessel 131 can be used to provide a homogenous glass melt composition, thereby reducing or eliminating cords of inhomogeneity that may otherwise exist within the fined glass melt exiting the fining vessel. As shown, the fining vessel 127 may be coupled to the glass melt mixing vessel 131 by way of a second connecting conduit 135. In some embodiments, glass melt may be gravity fed from the fining vessel 127 to the glass melt mixing vessel 131 by way of the second connecting conduit 135. For instance, gravity may act to drive the glass melt to pass through an interior pathway of the second connecting conduit 135 from the fining vessel 127 to the glass melt mixing vessel 131.

The fusion draw apparatus can further include another conditioning station such as a delivery vessel 133 that may be located downstream from the glass melt mixing vessel 131. The delivery vessel 133 may condition the glass to be fed into a forming device. For instance, the delivery vessel 133 can act as an accumulator and/or flow controller to adjust and provide a consistent flow of glass melt to the forming vessel. As shown, the glass melt mixing vessel 131 may be coupled to the delivery vessel 133 by way of a third connecting conduit 137. In some embodiments, glass melt may be gravity fed from the glass melt mixing vessel 131 to the delivery vessel 133 by way of the third connecting conduit 137. For instance, gravity may act to drive the glass melt to pass through an interior pathway of the third connecting conduit 137 from the glass melt mixing vessel 131 to the delivery vessel 133.

As further illustrated, a downcomer 139 can be positioned to deliver glass melt 121 from the delivery vessel 133 to an inlet 141 of a forming vessel 143. The glass ribbon 103 may then be fusion drawn off the root 145 of a forming wedge 147 and subsequently separated into a glass web, such as another glass ribbon or the illustrated glass sheet 104, by a glass separation apparatus 149. FIG. 1 illustrates a general schematic of the glass separation apparatus 149 wherein FIGS. 2-5, 7 and 8 schematically illustrate exemplary features of the glass separation apparatus 149. Indeed, as illustrated, the glass separation apparatus 149 may divide the glass sheet 104 from the glass ribbon 103 along a separation path 151 that extends in a direction 225 (see FIG. 2) that is transverse to the conveyance direction such as the draw direction 901. As illustrated in FIG. 1, in any of the embodiments of the disclosure, the direction 225 transverse to the conveyance direction 901 may include the direction 225 being perpendicular to the conveyance direction 901 or at another angle relative to the conveyance direction. In some embodiments, the direction 225 extends along a width "W" of the glass ribbon 103 between a first outer edge 153 and a second outer edge 155 of the glass ribbon 103. As illustrated in FIG. 1, in some embodiments, the conveyance direction 901 of the glass ribbon 103 can include the draw direction of the glass ribbon. In the illustrated embodiment, the conveyance direction 901 can be the fusion draw direction of the glass ribbon 103 being fusion down-drawn from the forming vessel 143. Alternatively, if the glass ribbon is being unwound from a spool of glass ribbon, the conveyance direction can be considered the direction along which the glass ribbon is being drawn from the spool. Still further, if the glass web (e.g., glass ribbon, glass sheet, etc.) is being traversed along a travel path, the conveyance direction can be considered the direction that the glass web travels along the travel path.

In one embodiment, shown in FIG. 1, a length of the glass ribbon 103 can be considered the overall length "L1" of the glass ribbon 103 extending from the root 145 of the forming wedge 147 to the outer end 171 (e.g., lower end) of the glass ribbon 103. In further embodiments, the length of the glass ribbon 103 may be considered a portion of the overall length "L1" of the glass ribbon. For example, the length of the glass ribbon 103 can be considered a dimension of the glass ribbon along a direction perpendicular to the width "W" of the glass ribbon 103. In addition or alternatively, the length of the glass ribbon 103 can be considered a dimension of the glass ribbon along the draw direction 901 of the glass ribbon 103.

In another embodiment, the glass separation apparatus 149 may separate an edge portion (e.g., an edge web portion) from the glass web. For example, as shown in FIG. 1, the glass separation apparatus 149 can separate an edge portion 159 of the glass sheet 104 from a central portion 161 of the glass sheet 104 along a separation path 163 that extends transverse to a conveyance direction of the glass sheet 104, wherein the separation path 163 extends between a first edge 165 and a second edge 167 of the glass sheet 104. In the illustrated embodiment, the separation path 163 extends along a length "L2" of the glass sheet that is perpendicular to the conveyance path of the glass sheet 104.

Figure 2:
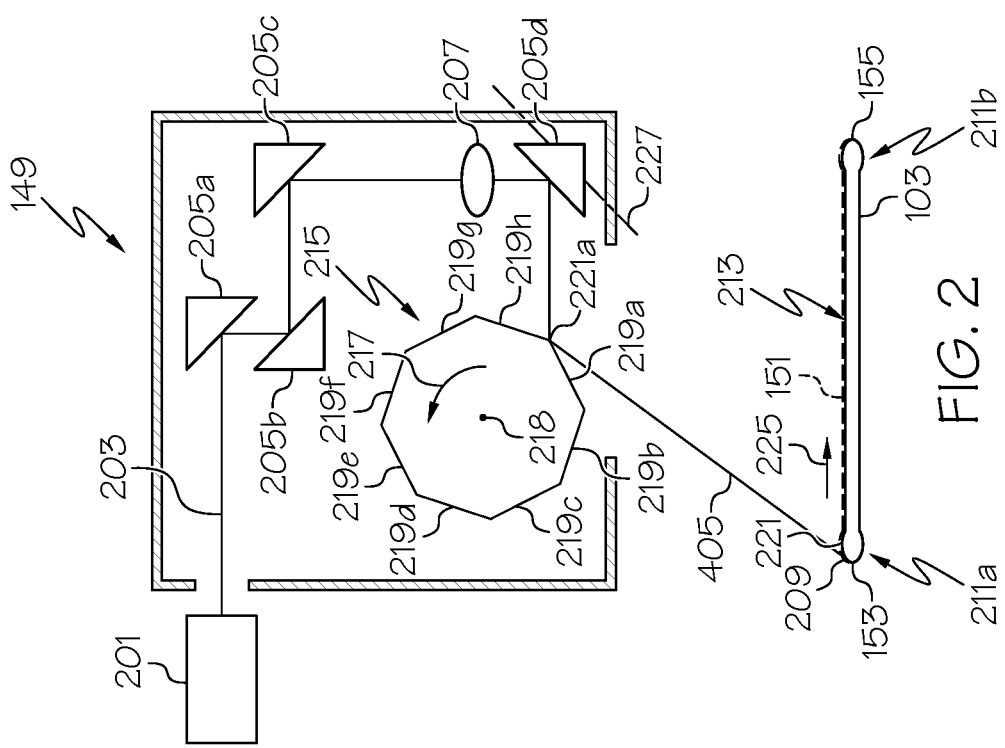
FIG. 2 is a cross sectional schematic view of an exemplary glass separation apparatus along line 2-2 of FIG. 1, wherein a laser beam is exposing an upstream end of a path on the glass ribbon.

FIG. 2 illustrates an exemplary glass separation apparatus 149 schematically illustrated in FIG. 1. The glass separation apparatus can include a laser beam generator 201 that produces a laser beam 203. In one embodiment, the laser beam generator produces a $CO_2$ laser beam that can heat the selected path with relatively long pulses that may approximate a continuous flow of energy can be utilized. As such, the laser beam 203 may be designed to heat the selected path on the glass ribbon (or glass sheet 104) without damaging the glass ribbon. For purposes of this application, heating the selected path on the glass ribbon without damaging the glass ribbon is intended to mean heating the path without damaging the glass ribbon in a manner that would otherwise result in separation of the glass ribbon without a defect. Examples of heating a selected path without damaging the glass ribbon can include heating without melting the glass ribbon, heating without ablating the glass ribbon, heating without creating a full-body crack in the glass ribbon, and heating without scoring the glass ribbon. Indeed, the laser beam 203 may avoid damaging the glass ribbon to allow generation of a desired level of thermal stress along the separation path 151, 163 of the glass ribbon (e.g., the glass ribbon 103 or the glass sheet 104) without separating the glass ribbon prior to application of the defect as discussed below.

As further shown in FIG. 2, the exemplary glass separation apparatus 149 may further include an optional series of reflectors 205a, 205b, 205c, 205d and one or more optical lenses 207 configured to provide a laser beam spot 209 on an outer edge portion 211a, 211b or a first major surface 213 of the glass ribbon 103 or glass sheet 104. Throughout the application, a laser beam spot 209 is considered the area of the surface of the glass web exposed to the laser beam 203 where the laser beam 203 intersects the surface of the glass web. In some embodiments, the laser beam spot may comprise a circular or rectangular laser beam spot or an oblong laser beam spot that is significantly less than the overall length of the separation path 151. In further embodiments, the laser beam spot may comprise an elongated laser beam spot that spans the entire length of the separation path 151 or even greater than the entire length of the separation path.

In some embodiments, the glass separation apparatus 149 can include a first reflector such as the illustrated polygonal reflector 215. The first reflector can include a first reflective surface. For instance, as shown in FIG. 2, the illustrated polygonal reflector 215 can include an octagonal reflector wherein the first reflective surface can comprise eight reflective surface segments 219a-h that may be integral with one another or provided as separate segments that are mounted in close proximity relative to one another. Furthermore, although an octagonal reflector may be used, other reflectors with more or less reflective surface segments may be used in accordance with aspects of the disclosure. The first reflective surface, or any reflective surface of the first reflector, or the reflective surface of any reflector of the disclosure, can comprise a surface of a mirror that reflects light from the reflective surface of the mirror, a reflective surface of polished metal or other reflective surface. In further embodiments, as shown, the reflective surfaces may be flat, although curved (e.g., concave, convex) surfaces may be provided in further embodiments.

In one embodiment, the method can include the step of exposing either one or both of the separation paths 151, 163 along the glass ribbon 103 or glass sheet 104 by rotating the first reflector in a clockwise or counterclockwise rotation. For instance, as shown in FIGS. 2-5 and 7-8, the polygonal reflector 215 may rotate in the counterclockwise direction 217 about a first rotation axis 218 to sequentially position each of the eight reflective surface segments 219a-h within the selected path of the laser beam 203. The illustrated rotation shown in the figures depicts the principles of sweeping the laser beam spot 209. Actual configuration and/or rotation of the polygonal reflector 215 will depend on a wide range of factors such as whether the laser beam spot 209 sweeps between extreme positions from the first outer edge 153 to the second outer edge 155 of the glass ribbon or whether the laser beam spot 209 sweeps off the glass ribbon as shown in FIGS. 5-8. The embodiments of FIGS. 9-18 illustrate the laser beam spot 209 sweeping between extreme positions from the first outer edge 153 to the second outer edge 155. Any embodiment of the disclosure, such as the embodiments of FIGS. 9-18 can also include the laser beam spot 209 sweeping off the glass ribbon as shown in FIGS. 5-8.

As discussed below, the laser beam can heat the separation path 151 on the glass ribbon. Throughout the drawings, the separation path 151 is schematically shown as a broken line with the understanding that the actual separation path is coincident with the glass ribbon such as the edge portions and/or major surfaces of the glass ribbon. As shown, the separation path 151 can extend along the outer edge portions 211a, 211b and a first major surface 213 of the glass ribbon 103 facing the glass separation apparatus 149 from the first outer edge 153 to the second outer edge 155, although the separation path can extend along the opposite major surface of the glass ribbon or at an intermediate location between the two major surfaces of the glass ribbon. Indeed, as shown, the separation path 151 can extend coincident with the outer surfaces of the outer edge portions 211a, 211b and also extend coincident with the first major surface 213 of the glass ribbon 103. Furthermore, as shown, the first outer edge portion 211a can include the first outer edge 153 and the second outer edge portion 211b can include the second outer edge 155 wherein the separation path 151 can extend across a substantial portion or the entire width "W" of the glass ribbon. Likewise, referring to FIG. 1, the glass sheet 104 can include the first edge 165 and the second edge 167 wherein the separation path 163 can extend across a substantial portion or the entire length "L2" of the glass sheet 104.

An exemplary method of heating the separation path 151 with the exemplary polygonal reflector 215 will now be discussed. As shown in FIG. 2, for example, as the first reflective surface segment 219a crosses the path of the laser beam, a first edge portion 221a of the first reflective surface segment 219a initially crosses the path of the laser beam 203 to reflect and expose an upstream end 221 of a separation path 151 across the glass ribbon 103 to the laser beam spot 209. Indeed, as shown, the upstream end 221 of the separation path 151 is exposed to the laser beam spot 209, thereby heating the separation path 151 at that location. As the polygonal reflector 215 rotates in the counterclockwise direction 217 about the first rotation axis 218, the angle of the first reflective surface segment 219a changes, such that the laser beam spot 209 travels along a direction 225 extending from the first outer edge portion 211a toward a second outer edge portion 211b of the glass ribbon 103.

Figure 3:
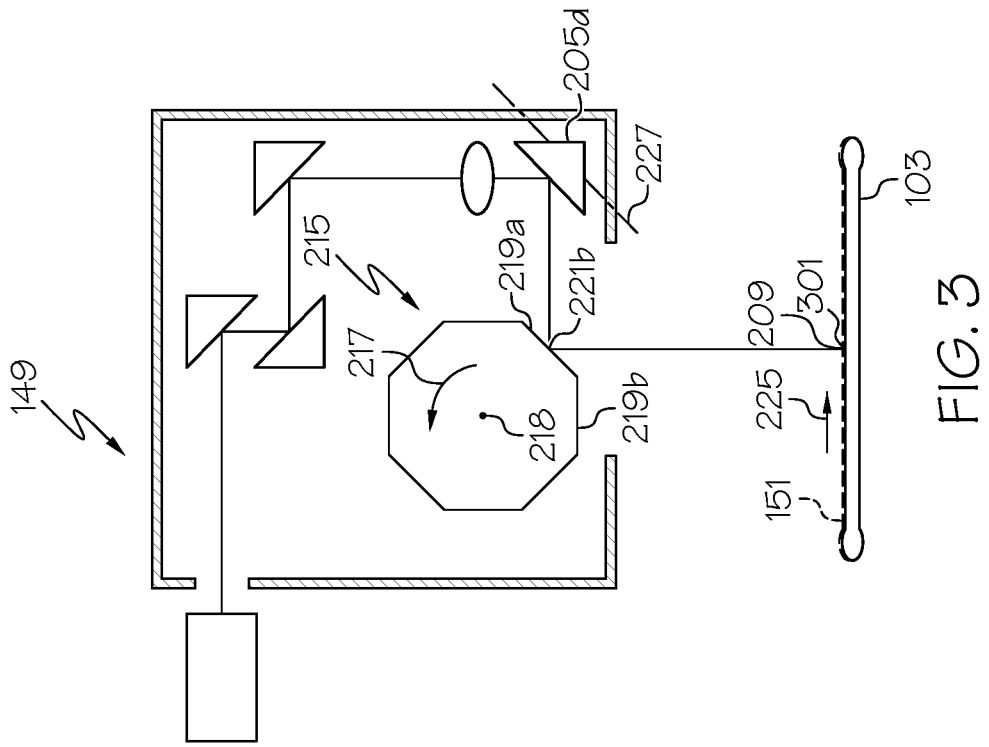
FIG. 3 illustrates the laser beam exposing an intermediate location of the path on the glass ribbon.

FIG. 3 illustrates the polygonal reflector 215 being rotated such that an intermediate portion 221b of the first reflective surface segment 219a subsequently crosses the path of the laser beam 203 to reflect and expose an intermediate location 301 of the separation path 151 to the laser beam spot 209, thereby heating the path at that location.

Figure 4:
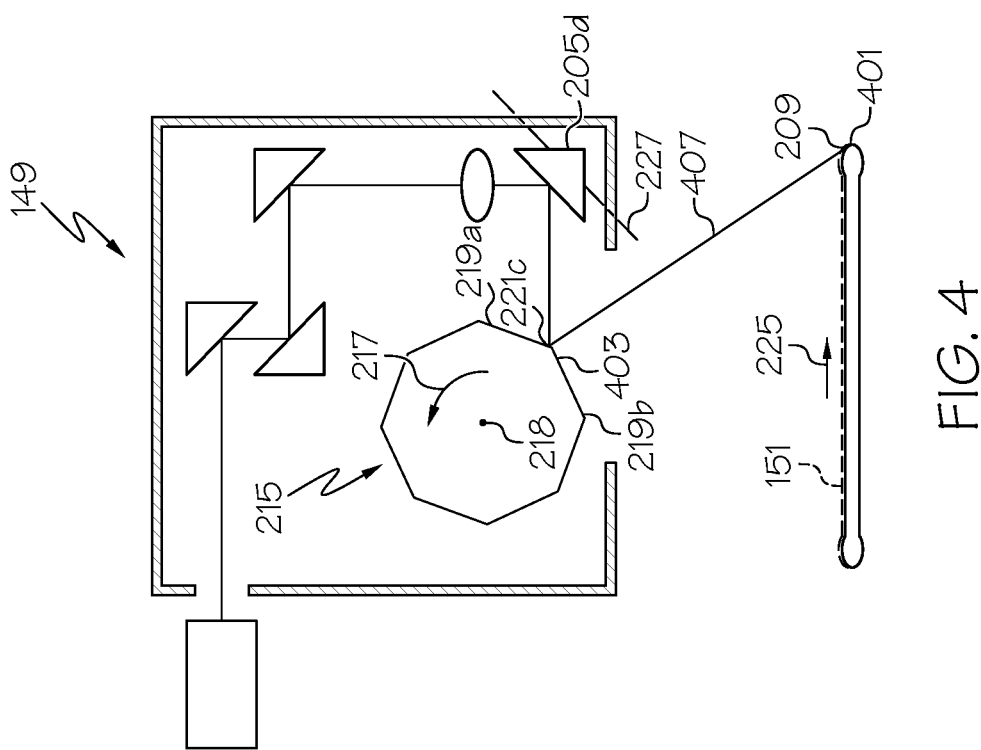
FIG. 4 illustrates the laser beam exposing a downstream end of the path on the glass ribbon.

As further shown in FIG. 4, the polygonal reflector 215 can be even further rotated in the counterclockwise direction 217 about the first rotation axis 218 such that a second edge portion 221c of the first reflective surface segment 219a subsequently crosses the path of the laser beam to reflect and expose a downstream end 401 of the separation path 151 to the laser beam spot 209, thereby heating the separation path at that location. A further incremental rotation in the counterclockwise direction 217 about the first rotation axis 218 shown in FIG. 4 will cause a first edge portion 403 of the second reflective surface segment 219b to cross the path of the laser beam 203, wherein the laser beam spot 209 will disappear from the downstream end 401 of the separation path 151 and reappear at the upstream end 221 of the separation path 151 as shown in FIG. 2. Of course, as the actual laser beam comprises a finite diameter, there is a short moment in time where the laser beam will simultaneously reflect from adjacent portions of adjacent reflective surface segments. At such a moment in time, the laser beam spot 209 may partially appear simultaneously at the outer extremes of the sweep path. For example, referring to FIG. 4, during a short period of time, the laser beam 203 will reflect simultaneously from the second edge portion 221c of the first reflective surface segment 219a and the first edge portion 403 of the second reflective surface segment 219b. At such moment in time, the laser beam spot 209 may partially appear at the location shown in FIG. 4 and partially appear at the location in FIG. 2.

As such, the step of heating can include repeatedly passing the laser beam spot 209 along the separation path 151 to produce thermal stress along the separation path 151. Moreover, in the illustrated embodiment, the step of repeatedly passing the laser beam spot 209 can optionally include repeatedly passing the laser beam spot 209 in the single direction 225. Indeed, as each of the reflective surface segments 219a-h crosses the path of the laser while the polygonal reflector 215 rotates in the illustrated counterclockwise direction 217 about the first rotation axis 218, the laser beam spot 209 always moves in the single direction 225 from the upstream end 221 to the downstream end 401 of the separation path 151. The laser beam spot can travel at various speeds along the single direction 225 depending on the rotational speed of the polygonal reflector 215. For example, the laser beam spot can travel along separation path 151 from about 0.5 km/s to about 6 km/s, such as from about 1 km/s to about 5 km/s, such as from about 2 km/s to about 4 km/s such as about 3 km/s.

Although not shown, in further embodiments, the separation path 151 may be heated in a wide variety of ways. For instance, multiple laser beam generators 201 may be provided and/or the laser beam produced by the laser beam generator may be split into two or more laser beams to simultaneously reflect laser beams from different mirrors and/or different portions of the same mirror of the polygonal reflector. As such, multiple laser beam spots may be provided that travel simultaneously along the separation path 151 in the single direction 225 or along opposite directions depending on the optical configuration of the glass separation apparatus 149. In another embodiment, the laser beam 203 produced by the laser beam generator 201 may be extended into an elongated laser beam spot that simultaneously heats the entire separation path 151. In such embodiments, the laser beam spot 209 may remain stationary while simultaneously heating the entire separation path 151. In still further examples, a plurality of stationary laser beam spots may be provided to heat the entire separation path 151. For instance, the stationary laser beam spots may be positioned end to end wherein the overall length of all of the laser beam spots extends along the entire length of the separation path 151, or greater than the entire length of the separation path 151. In further embodiments, the stationary laser beam spots may be positioned to partially overlap one another wherein the overall length of all of the laser beam spots also extends along the entire or greater than the entire length of the separation path 151.

Figure 8:
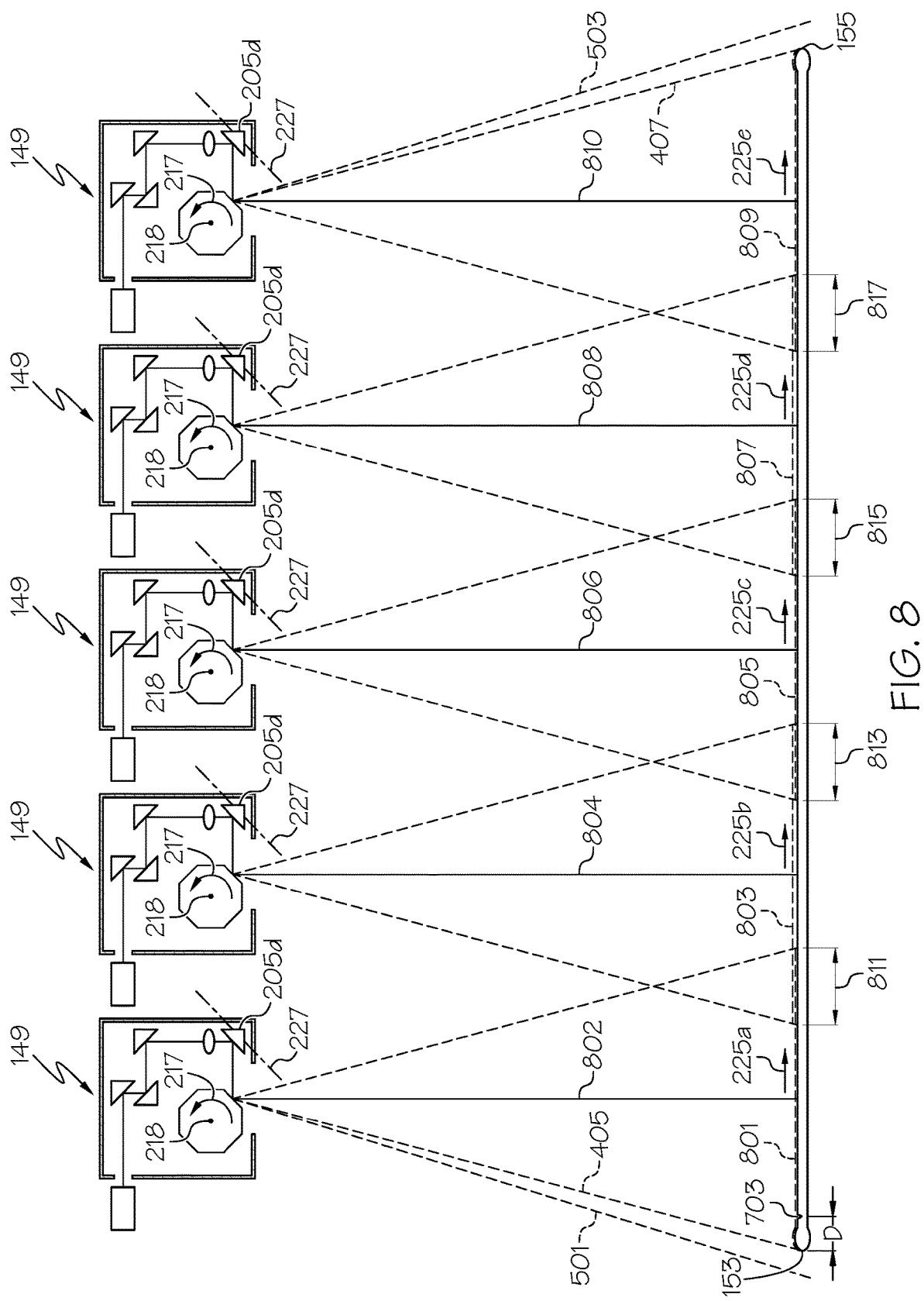
FIG. 8 illustrates another embodiment wherein the path is exposed to a plurality of laser beams that each produces thermal stress along a corresponding segment of the path.

In still another embodiment, a plurality of the glass separation apparatus 149 may be provided that each exposes a segment of the overall separation path to the laser beam spot 209. For instance, as shown in FIG. 8, a plurality of glass separation apparatus 149 may be provided that may optionally be similar or identical to the previously-described glass separation apparatus 149. It should be noted that while five glass separation apparatus 149 are depicted in FIG. 8, this depiction should not limit the scope of the claims appended herewith as any number of glass separation apparatus (e.g., from 1, 2, 3 to greater than 5 glass separation apparatus) can be used in embodiments of the claimed subject matter. Each glass separation apparatus 149 may produce a laser beam 802, 804, 806, 808, 810 that can produce thermal stress along a corresponding heated segment 801, 803, 805, 807, 809 along the overall separation path with a respective laser beam spot 209 provided by each laser beam. In some embodiments, the heated segments may be positioned end-to-end to heat the separation path. However, as shown, each heated segment may overlap at least one adjacent heated segment at overlapping regions 811, 813, 815, 817 to provide sufficient heating of the separation path between the segments. In some embodiments, the overlapping regions may include an overlapped length that is from about 5% to about 40% of the length of at least one of the heated segments 801, 803, 805, 807, 809, such as from about 10% to about 30%, such as about 10% to about 25% of the length of at least one of the heated segments. In one embodiment, each corresponding heated segment 801, 803, 805, 807, 809 can have a length of about 800 millimeters (mm) with each overlapping region 811, 813, 815, 817 having an overlapped length of about 100 mm. Providing the segments and optional overlapping regions can help achieve a sufficient level of thermal stress along the overall separation path extending along the glass ribbon.

Some embodiments of the disclosure demonstrate the laser beam spot traveling across a substantial portion of the glass ribbon, such as the entire dimension of the glass ribbon, and in other embodiments, the laser beam spot is also shown to travel off the glass ribbon. As such, the separation path 151, 163 can likewise extend across a substantial portion of the glass ribbon, such as the entire dimension of the glass ribbon. For instance, as illustrated, the laser beam spot 209 passes along the entire width "W" of the glass ribbon 103 from the first outer edge 153 to the second outer edge 155 such that the separation path 151 extends the entire width "W" of the glass ribbon 103. Likewise, as further illustrated in FIG. 1, the laser beam spot 209 passes along the entire length "L2" of the glass sheet 104 from the first edge 165 to the second edge 167 such that the separation path 163 extends the entire length "L2" of the glass sheet 104. In some embodiments, the separation path 151, 163 can be from about 50 mm to about 5000 mm, such as from about 50 mm to about 1000 mm, although the laser beam spot 209 may travel along longer or shorter paths in further embodiments.

The laser beam spot 209 can comprise a circular spot, although elliptical or other spot shapes may be provided in further embodiments. A minimum diameter of the circular laser beam spot at the focused waist can be from about 1 mm to about 2 mm, when determined as $1/e^2$ of the intensity profile of the spot, although other dimensions may be provided in further embodiments. Likewise, the maximum length of an elliptical or other spot shape can be from about 1 mm to about 3 mm, although other dimensions may be provided in further embodiments. For example, when utilizing a stationary laser beam, the laser beam spot shape can be substantially elongated and have a length of tens of centimeters, for example in excess of 1 meter in length. One or a plurality of stationary laser beam spots may be used to expose the separation path 151.

Figure 5:
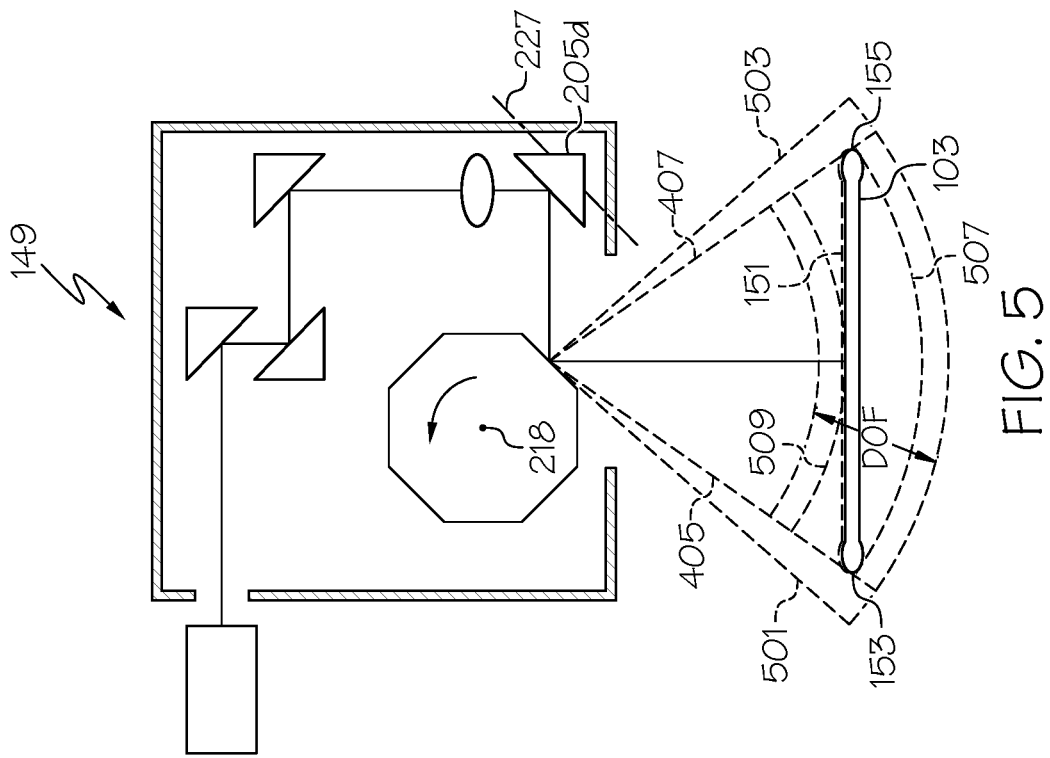
FIG. 5 illustrates the path on the glass ribbon being positioned within the depth of focus of the laser beam.
Figure 7:
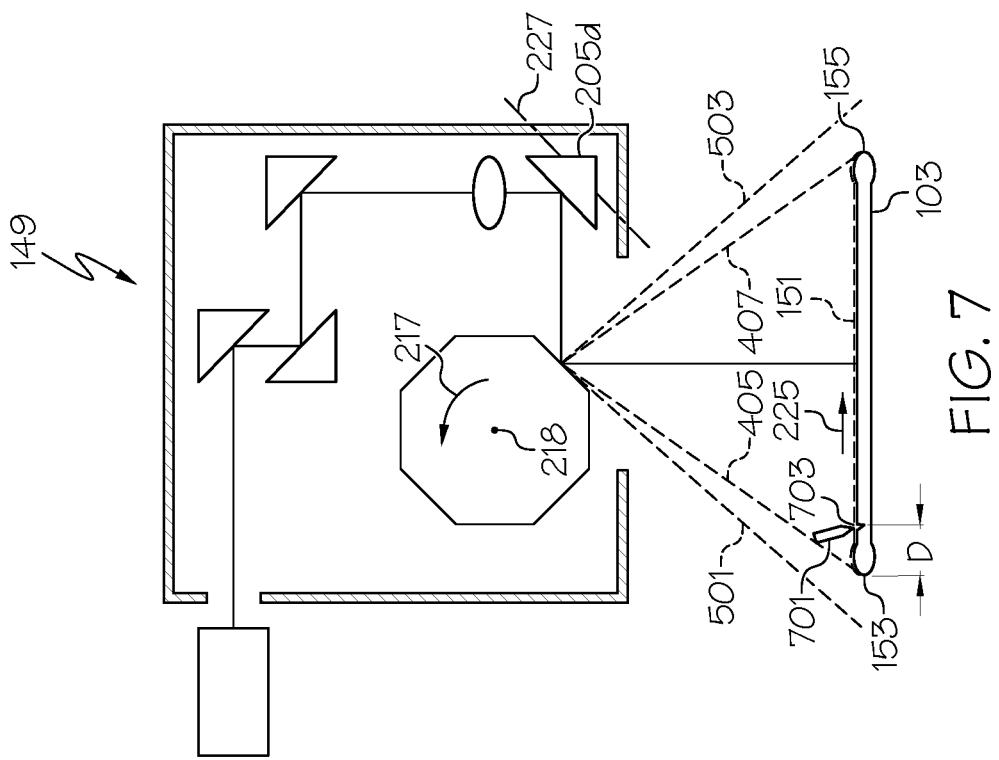
FIG. 7 illustrates the step of creating a defect in the glass ribbon on the path.

FIGS. 2-5, 7 and 8 demonstrate an embodiment wherein a laser beam 203 sweeps between a first outer position 405 and a second outer position 407 (See FIGS. 2, 5, 7 and 8). In any of the embodiments of the disclosure, the laser beam 203 can travel off the glass ribbon during the step of heating the separation path. For instance, as shown in FIGS. 5, 7 and 8, the sweep of the laser beam 203 can optionally extend between outer positions 501, 503 that are outside the first and second outer edges 153, 155. Likewise, although not shown, the sweep of the laser beam of FIGS. 9-18 can also travel off the glass ribbon during the step of heating. Allowing the laser beam to sweep off the glass ribbon during heating can ensure that all portions of the separation path 151 achieve a sufficient level of thermal stress.

As further illustrated in FIG. 5, while exposing the separation path 151 along the glass ribbon, the glass ribbon may be positioned such that the entire separation path 151 is located within the depth of focus "DOF" of the laser beam. The depth of focus "DOF" can be calculated by the formula:

$$DOF = \left(\frac{8\lambda}{\pi}\right)\left(\frac{F}{D}\right)^2$$

where "F" is the focal length of the lens 207, "D" is the beam diameter before the lens and "λ" is the wavelength.

Positioning the entire separation path 151 within the depth of focus of the laser beam 203 can help increase efficiency of energy transfer from the laser beam to the separation path 151. Since the depth of focus of the laser beam exceeds amplitudes of the glass warp, thickness variation and motion of the glass ribbon during separation, the depth of focus enables separation of non-flat glass with variable thickness, which can also move or to some extent change orientation relative to the laser beam generator 201. In some embodiments, the depth of focus "DOF" can be from about 20 mm to about 400 mm, such as from about 20 mm to about 200 mm although other depths of focus may be provided in further embodiments.

Furthermore, in some embodiments, the entire glass ribbon, in addition to the path of the glass ribbon, may be positioned within the depth of focus. The depth of focus of the laser beam can be large enough to exceed variations of the glass thickness, glass warp or other possible changes in the position of the glass ribbon, and consequently the separation path on the glass ribbon, relative to the laser beam generator during the methods of the present disclosure.

Furthermore, in some embodiments, a dimension of the laser beam spot 209 on a major surface of the glass ribbon varies while repeatedly passing the laser beam spot along the separation path 151, especially near the ends of the separation path. For example, the dimension of the laser beam spot 209 on the major surface of the glass ribbon may vary along the separation path 151 when the laser beam 203 is focused along sweep path 507 or sweep path 509, although other sweep paths may be provided while the glass ribbon is still maintained within the depth of focus.

Figure 6:
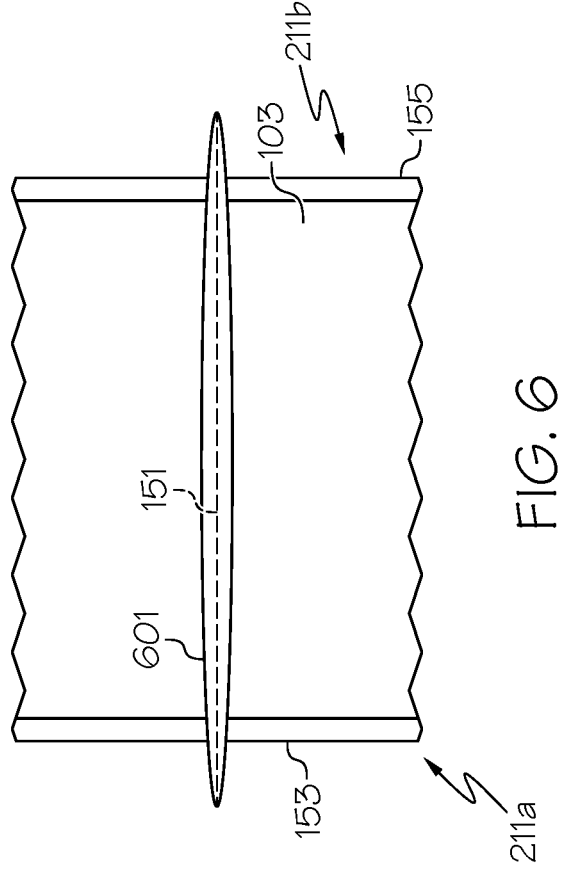
FIG. 6 is a side view of the glass ribbon of FIG. 5 illustrating a varying power density along the path of the glass ribbon.

As shown in FIG. 6, if traveling along sweep path 509, the laser beam spot 209 may apply a varying power density along the separation path 151, as represented by the illustrated truncated elliptical power density area 601, due to the changes in the diameter and shape of the laser beam spot 209 along the separation path 151. The elliptical power density area 601 of the laser beam spot 209 on the surface of the glass ribbon is truncated since the laser beam spot intentionally travels off the glass ribbon in the embodiment shown in FIG. 6. In further embodiments, a non-truncated elliptical power density area may be provided. For instance, the end points of the elliptical power density area in some embodiments may be located at the respective first and second outer edges 153, 155 of the glass ribbon 103. When the outer edge portions 211a, 211b comprise thickened edge beads, it may be even more beneficial to separate the glass ribbon using two laser beams 203 that produce maximum power densities located near or at the thickened edges (e.g., edge beads), with portions of the respective laser beam spots overlapping in the central area of the glass ribbon. As the maximum power densities are located closer or at the thickened edges, higher thermal stress may be targeted at the thickened edge beads, resulting in increased thermal stress. At the same time, partially overlapping the relatively lower power density provided by the tail of the laser beam spot can provide enhanced thermal stress due to double exposure from the overlapping laser beam spots. Such overlapping can also be provided at overlapping regions 811, 813, 815, 817 shown in FIG. 8, wherein double exposure can account for the lower power density at the outer ends of the heated segments to help achieve a sufficient level of thermal stress along the overall separation path extending along the glass ribbon.

Localized heating of the separation path 151 creates a temperature differential between different portions of the glass ribbon that creates thermal stress along the separation path 151. The process of heating the separation path 151, as discussed above, can be carried out until a predetermined level of stress is achieved. In some embodiments, the preferred predetermined level of stress is the stress corresponding to the temperature along the separation path 151 that is from about 70% to about 100% of the strain temperature point of the glass, such as from about 80% to about 100%, such as from about 90% to about 100%, such as from about 95% to about 100% of the strain point of the glass. This level of heating avoids generation of residual stress in the glass ribbon. In further embodiments, the predetermined level of stress is the stress corresponding to the temperature along the separation path 151 that is from the strain point up to the annealing point of the glass. While lower temperatures may be possible, sometimes it can be desired to reach relatively higher temperatures to maximize the thermal stress along the separation path 151. Providing a relatively high thermal stress can help reduce the separation time after applying the defect discussed more fully below. In some embodiments, the separation time can be from about 0.1 second to about 3 seconds after creating the defect, although other separation times are possible in further embodiments.

The time necessary to heat the separation path to the desired level of thermal stress can depend on a wide range of factors such as laser power, type of glass, dimension of the glass, its thickness or other factors. In some embodiments, the separation path 151, 163 may be sufficiently heated in a range from about 0.1 seconds to about 5 seconds with a $CO_2$ laser power from about 300 W to about 1.5 kW and a glass thickness from about 0.1 mm to about 3 mm.

As set forth above, the method of separating the glass ribbon (e.g., glass ribbon, glass sheet, etc.) can include the step of exposing a separation path 151 on the glass ribbon to at least one laser beam spot 209 to produce thermal stress along the separation path without damaging the glass ribbon. The method can also include the step of creating a defect on the separation path while the separation path is under thermal stress produced during the step of exposing the separation path on the glass ribbon to at least one laser beam spot 209, whereupon the glass ribbon spontaneously separates along the separation path in response to the defect.

In one embodiment, the defect is produced after a predetermined level of thermal stress is achieved along the separation path 151 during the step of exposing the separation path to the at least one laser beam spot 209. Indeed, as the entire separation path is under a predetermined level of thermal stress, the initiation of the defect directly results in the glass ribbon spontaneously separating along the separation path in response to the defect. The spontaneous separating can begin as the defect is being created or immediately after the defect is created. As such, separation of the glass ribbon can occur as a direct result of the defect that quickly propagates a full body crack along the entire separation path to separate the glass ribbon based on the predetermined level of thermal stress achieved with the laser beam spot 209 and without assistance of other separation forces such as bending, quenching or otherwise stressing the glass sheet. As used herein, the term full body crack refers to a crack that extends through the entire thickness of the glass ribbon. The time to separate the glass web (e.g., glass ribbon) in accordance with aspects of the disclosure can significantly reduce the time necessary to separate the glass web when compared to conventional techniques. As such, aspects of the disclosure can be beneficial in applications where quick separation of the glass web is desirable over conventional techniques. For instance, in applications with increased draw speed, quick separation can be beneficial to allow separation to occur within a given travel length of the glass ribbon. Furthermore, methods of the disclosure can separate the glass ribbon even at elevated temperature conditions. For example, while separation can occur while the glass ribbon is at room temperature, separation can also occur when the glass ribbon is at an elevated temperature typically below the glass strain point, for example, at a temperature up to 400° C. although other maximum temperatures may be provided in further embodiments. As such, methods of the disclosure can provide separation before the glass ribbon is cooled during the forming process or during other processing procedures.

In one embodiment, as shown in FIG. 7, in any of the embodiments discussed above, the step of creating the defect can be performed while performing the step of exposing the selected separation path to the at least one laser beam spot 209 to produce thermal stress along the separation path. Creating the defect while exposing the separation path can help maintain a sufficient level of thermal stress along the separation path to provide quick separation that spontaneously occurs in direct response to creating the defect. In some embodiments, the step of exposing the selected separation path may be completed after beginning the step of creating the defect and may even continue until the spontaneous separation of the glass ribbon along the separation path is complete. Another advantage of creating the defect while exposing the separation path is reduction of probability of uncontrollable breakage, which may start during exposure (heating), when the defect is created prior to exposure. This can enable reliable separation of strengthened glasses, laminated glass structures and any other glass products having high internal stress. Yet, another advantage of creating the defect while exposing the path is reduction of overall time required for separation.

In further embodiments, the step of exposing the selected separation path 151 may be completed just prior to creating the defect, at the time the defect is being created, immediately after the defect is created, or shortly after the defect is created. In such embodiments, the defect can still be created when there is sufficient residual thermal stress along the separation path to provide spontaneous separation along the separation path. In some embodiments, however, the speed of separation can be increased by continuing to expose the separation path 151 to the at least one laser beam spot 209 while creating the defect and even after creating the defect (e.g., during the entire separation of the glass ribbon). Indeed, continuing to expose the separation path while creating the defect can increase the speed of separation by maintaining a predetermined thermal stress, such as a maximum thermal stress along the separation path. However, overexposure of the separation path should be avoided to minimize or avoid generation of residual stress along the separated edges due to overheating.

The step of creating the defect may be performed in a wide variety of ways. For instance, as shown schematically in FIG. 1, in one embodiment, the defect may be created by mechanically engaging the glass ribbon 103, for example, with a mechanical tool 701 (e.g., score wheel, indenter, rotary tool (rotating disk), diamond tip, etc.). Indeed, as shown in FIG. 7, a tip of the scribe 701 can create a defect 703 such as a surface imperfection (e.g., surface crack). In further embodiments, the defect may be provided as a point defect or a score line. Although not shown, a support device such as an air bearing or mechanical contact support member may be provided to help counteract the force applied by the scribe 701 to facilitate creation of the defect 703.

Figure 12:
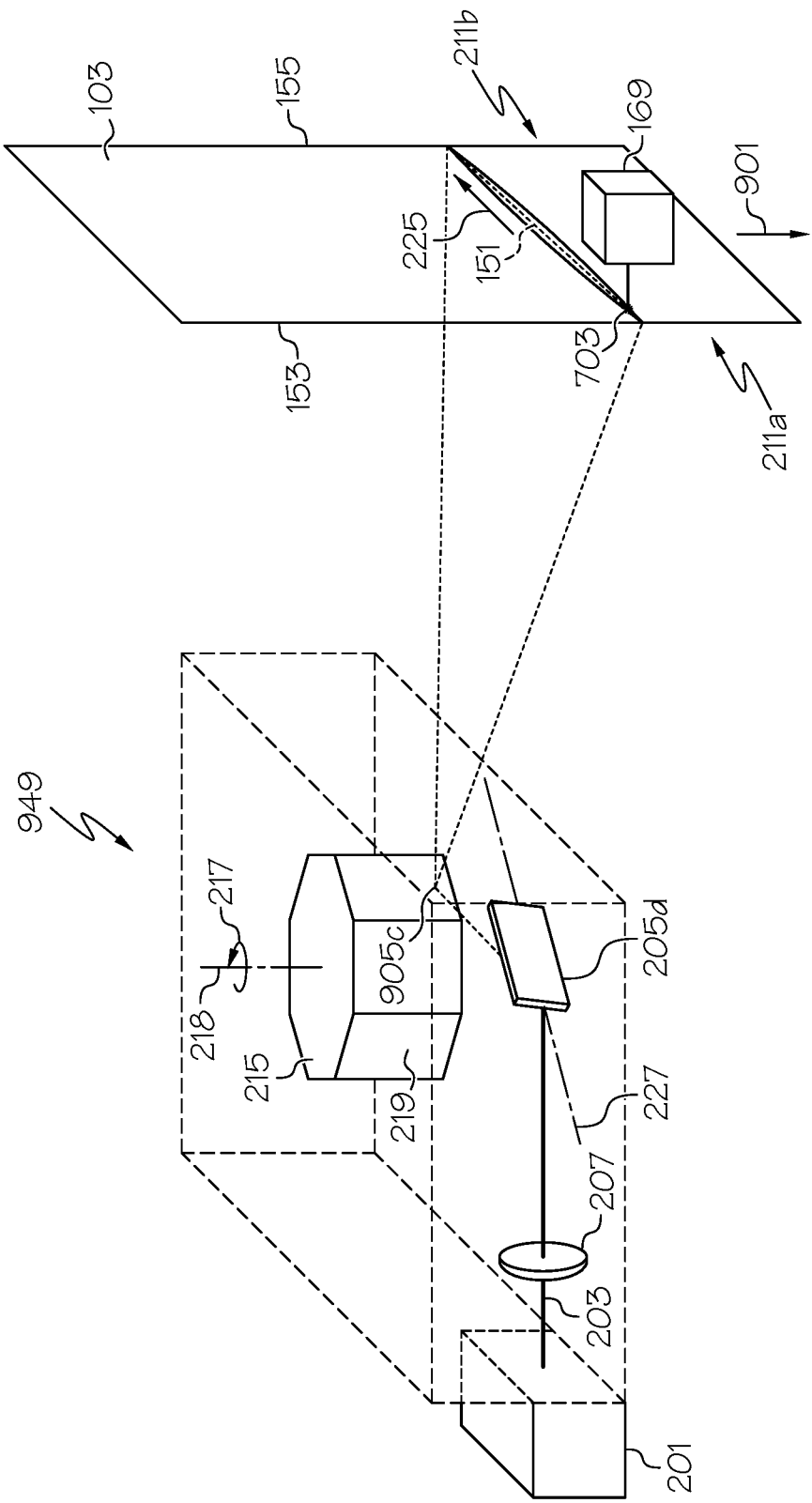
FIG. 12 is the perspective schematic view of the apparatus of FIG. 11, with a defect being created on the separation path while the separation path is under thermal stress.
Figure 17:
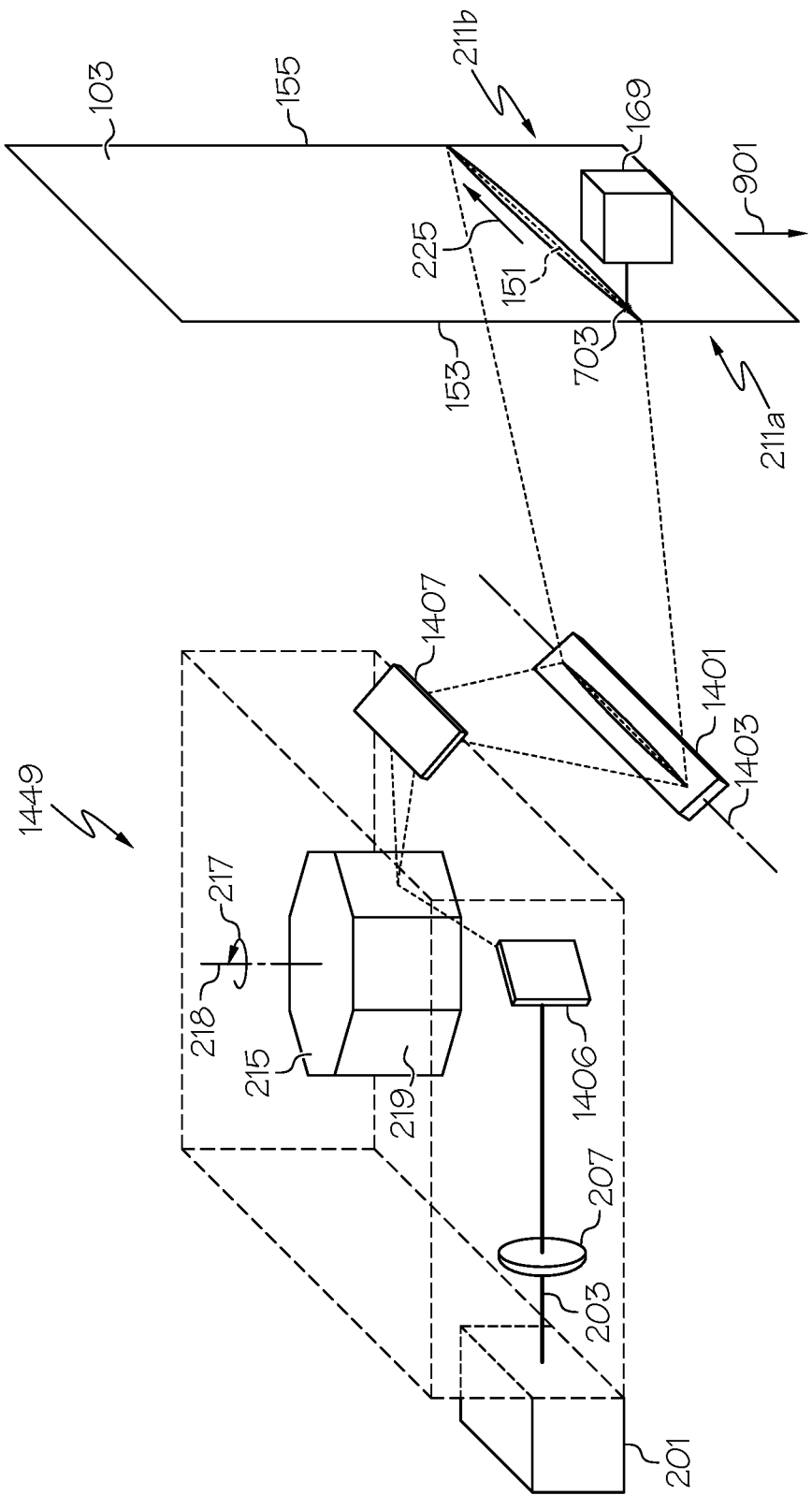
FIG. 17 is the perspective schematic view of the apparatus of FIG. 16, with a defect being created on the separation path while the separation path is under thermal stress.

In another embodiment, as shown in FIG. 1, the defect may be created with a laser beam generator 169. In one embodiment, the laser can comprise a pulsed laser that can be used to create a defect such as a surface imperfection although sub-surface imperfections may be provided. In some embodiments the defect produced by the laser beam generator 169 can comprise a crack, a point defect, a score line, or other defect wherein such defect may optionally be created by an ablation process. In some embodiments, the defect can be located on an outwardly facing side opposite the side of the glass ribbon being exposed to the laser beam spot. For instance, as shown in FIGS. 12 and 17, the laser beam generator 169 is located to provide the defect on the outwardly facing side of the glass ribbon 103 opposite the side of the glass ribbon being exposed to the laser beam spot. In further examples, the defect can be located on the inwardly facing side being exposed to the laser beam spot and may even include defects on both sides of the glass ribbon. For instance, the laser beam generator shown in FIGS. 12 and 17 may be located on the other side of the glass ribbon to provide the defect on the inwardly facing side being exposed to the laser beam spot and may even be located on both sides of the glass ribbon to provide defects on both sides of the glass ribbon. Still further, the defect may also be located on the outer edge of the ribbon, on one corner, both corners (e.g., two defects) or a continuous defect extending from the inwardly facing surface to the outwardly facing surface.

In some embodiments, providing the defect as a score line may be beneficial to help direct a proper full body crack along the direction of the separation path 151, 163. For example, the score line can have a length extending along the separation path 151, 163 and a width that is perpendicular to the separation path. Exemplary score lines can have a wide range of lengths and widths, such as a length within a range from about 0.5 mm to about 5 mm and a width from about 0.1 mm to about 0.3 mm. If provided as a surface defect, the depth of the defect can be from about 5 micrometers to about 500 micrometers, depending on the type of glass. For example, with chemically strengthened glass, a deeper defect may be provided to reach past the chemically strengthened layer of the glass ribbon.

The defect 703 may be provided at any location along the separation path 151, 163 such as on the separation path. In one embodiment, the defect is located near one of the first and second outer edges 153, 155 of the glass ribbon. In one embodiment, it can be beneficial to locate the defect near the first outer edge 153 where scanning of the laser beam spot 209 starts as described below. For instance, as shown in FIG. 7, the defect 703 can be applied between the first outer edge 153 and the second outer edge 155 of the glass ribbon 103, or the defect may be provided at the first edge and/or the second edge in further embodiments. Applying the defect between the first edge and the second edge can be beneficial to help ensure that the crack begins to propagate at the location of the defect rather than at an edge imperfection that may exist at the edge of the glass ribbon. Moreover, applying the defect between the first edge and the second edge of the glass ribbon 103 can also result in faster separation of the glass ribbon. In some embodiments, the defect can be created on a thickened edge bead commonly found at the outer edge portions 211a, 211b of the glass ribbon 103. Alternatively, as shown in FIGS. 7 and 8, the defect may optionally be provided inboard of the thickened edge beads. In some embodiments, the defect is created a distance from at least one edge of the glass ribbon, wherein the distance is from about 1 mm to about 25 mm. For instance, as shown in FIGS. 7 and 8, in some embodiments, the defect 703 may be created a distance "D" from the first edge (e.g., 153, 165) of from about 1 mm to about 25 mm, such as from about 1 mm to about 10 mm although different distances may be provided in further embodiments.

In some embodiments, the defect may be created at a central portion of the separation path or closer to the first edge or the second edge of the glass ribbon 103. In one embodiment, as shown in FIG. 7, the defect 703 may be created closer to the first outer edge 153 than the second outer edge 155. Providing the defect 703 closer to the first outer edge 153 of the glass ribbon (e.g., a distance "D" from the first outer edge 153) can be particularly beneficial when the laser beam spot 209 travels in the single direction 225 from the first outer edge 153 toward the second outer edge 155 of the glass ribbon as discussed above. In such an embodiment, the first outer edge 153 of the glass ribbon 103 is upstream along the travel path of the laser beam spot 209 in the single direction 225. As the full body crack tends to propagate in the single direction 225 of the laser beam spot 209, locating the defect closer to the first outer edge 153 of the glass ribbon can help propagate the full body crack quickly downstream across the width (or length) of the glass ribbon in the direction 225. Furthermore, the defect 703 can be located the distance "D" that is close enough to also allow the full body crack to propagate upstream to intersect with the first outer edge 153.

Furthermore, with reference to FIG. 8, the laser beams 802, 804, 806, 808, 810 can be timed to allow the laser beam spot of each laser beam to travel along the corresponding single direction 225a, 225b, 225c, 225d, 225e in a sequential pattern such that adjacent laser beam spots may coexist along the overlapping regions 811, 813, 815, 817. As such, a laser beam spot may substantially continuously travel along the single direction across the overall width or length of the glass ribbon to help quickly drive the full body crack along the overall separation path.

Any of the methods discussed above may be applied to separate a glass web, such as a glass sheet or a glass ribbon. As such, embodiments discussed with respect to the glass ribbon 103 may also apply to the glass sheet 104 or other glass web. For instance, as illustrated with respect to FIG. 1, the separation path 151 can extend across the width "W" of the glass ribbon 103 between the first outer edge 153 and the second outer edge 155 of the glass ribbon 103. In such embodiments, creating the defect separates a glass sheet 104 from the glass ribbon 103 as shown in FIG. 1. In further embodiments also illustrated in FIG. 1, the separation path 163 can extend along the length "L2" of the glass sheet 104 between the first edge 165 and the second edge 167 of the glass sheet. In such embodiments, creating the defect can separate the edge portion 159 of the glass sheet 104 from the central portion 161 of the glass sheet 104.

Any of the above methods can facilitate separating of a wide range of glass ribbons that may be flat (as shown) or may have a non-flat (e.g., warped) configuration such as bowed into a C-shape, S-shape or other configuration. Furthermore, any of the methods can facilitate separation of glass ribbons with a substantially uniform thickness or a non-uniform variable thickness. For instance, as shown, a glass ribbon with relatively thick edge beads and a relatively thin central portion can be separated.

In another embodiment, the glass ribbon may be separated when the glass ribbon is relatively stationary or when the glass ribbon is in motion. For example, the glass ribbon may be separated while in motion as it is being drawn from a forming member or if the glass ribbon is slightly swinging and/or twisting relative to the forming member. Still further, any of the methods of the disclosure can be used to separate glass ribbon that is at an elevated temperature not exceeding approximately the strain point of the glass ribbon.

Furthermore, methods of the disclosure can be used to separate non-strengthened glass or strengthened glass. For instance, methods can be used to separate a strengthened glass ribbon (e.g., chemically strengthened glass ribbon) including at least one outer layer under compression and another layer in tension. In one particular embodiment, methods of the disclosure can be used to separate strengthened glass ribbon that is strengthened on both sides, wherein the two major surfaces of the glass ribbon are in compression and the central portion of the glass ribbon is in tension.

In further embodiments, methods of the disclosure may be used to separate glass ribbon comprising laminated glass ribbon layers. In one embodiment, the laminated structure can be provided with a compressive surface layer and a central layer under tension. In another embodiment, the laminated structure can be provided with two compressive surface layers with a central layer under tension sandwiched between the two compressive layers. In still further embodiments, methods of the disclosure may be used to separate laminated glass ribbon layers where at least two of a plurality of layers includes different compositions and/or different coefficients of thermal expansion. In other embodiments the glass ribbon may be a chemically or thermally strengthened glass ribbon, wherein the glass ribbon comprises a surface compressive stress layer produced by ion exchange or thermal processing.

In further embodiments, the depth of focus of the laser beam may exceed amplitudes of the glass ribbon thickness variations, amplitude of warp, amplitude of glass motion relative to the beam source or other variations in processing conditions.

FIGS. 9-18 demonstrate exemplary apparatus and methods that may separate the glass ribbon 103 while the glass ribbon moves along a direction of the length of the glass ribbon. Unless otherwise noted, aspects of the disclosure discussed above and with reference to FIGS. 1-8 may apply to the exemplary apparatus and methods of FIGS. 9-18.

FIGS. 9-13 illustrate an exemplary glass separation apparatus 949 for separating the glass sheet 104 from the glass ribbon 103. FIGS. 14-18 illustrate another exemplary glass separation apparatus 1449 for separating the glass sheet 104 from the glass ribbon 103. The embodiments of FIGS. 9-13 and FIGS. 14-18 can be similar, or identical, to the embodiments shown in FIGS. 1-7 (and in duplicate in FIG. 8) but may be simplified to optionally remove one or more of the reflectors 205a-c. Each glass separation apparatus 949, 1449 includes at least one laser, such as the laser beam generator 201 that produces the laser beam 203 as discussed more fully above. Each glass separation apparatus 949, 1449 further includes a first reflector, such as the polygonal reflector 215 discussed above. As mentioned previously, the polygonal reflector 215 can include the previously-discussed first reflective surface. The first reflective surface is rotatable (e.g., in the counterclockwise direction 217) about a first rotation axis 218. As mentioned above, in some embodiments the first reflective surface 219 of the polygonal reflector 215 may comprise a plurality of reflective surface segments similar or identical to the previously-discussed eight reflective surface segments 219a-h. As further shown in the embodiments of FIGS. 9-13 and FIGS. 14-18, the plurality of reflective surface segments may be rotated (e.g., in the counterclockwise direction 217) about the first rotation axis 218 to reflect the laser beam 203 from the reflective surface segments to cause the resultant laser beam spot 209 to repeatedly pass along the separation path 151 on the glass ribbon 103 in a direction transverse to the conveyance direction 901 such as a direction of the width "W" of the glass ribbon to produce thermal stress along the separation path 151.

As shown in the embodiments depicted in FIGS. 9-13 and FIGS. 14-18, the glass separation apparatus 949 for separating the glass sheet 104 from a glass ribbon 103 further includes a second reflector 205d, 1401 including a respective second reflective surface 206, 1402 that may be rotatable about a corresponding second rotation axis 227, 1403 along direction 903, 1405 to reflect the laser beam 203 to cause the laser beam spot 209 to move in the conveyance direction 901. In some embodiments, the method includes moving the laser beam spot 209 at a laser beam spot velocity including a laser beam spot velocity vector in the conveyance direction 901 that is equal to the glass web velocity vector in the conveyance direction 901. As such, the laser beam spot 209 remains on the same separation path 151 to continuously heat the separation path 151 and consequently continuously increase thermal stress along the separation path 151 even though the glass ribbon 103 is moving in the conveyance direction 901 (e.g., draw direction). In a downdraw process, the laser beam spot 209 can include a velocity vector in the draw direction 901 that is equal or substantially equal to the velocity of the glass ribbon in the draw direction 901. As such, the laser beam spot 209 remains on the same separation path 151 of the glass ribbon 103 to continuously heat the separation path and consequently continuously increase the thermal stress along the separation path 151 even though the glass ribbon is moving in the draw direction of the glass ribbon 103.

As shown in FIGS. 9-13 and FIGS. 14-18, the first rotation axis 218 may be perpendicular to the second rotation axis 227, 1403 although the first axis and second axis may be orientated at another angle relative to one another depending on the optical configuration and/or the desired properties of the laser beam spot 209.

In some embodiments, the first reflector may be positioned upstream or downstream relative to the second reflector. For example, the glass separation apparatus 949 of FIGS. 9-13 illustrate an embodiment where the second reflector 205d is positioned upstream of the first reflector 215 such that the laser beam 203 reflects off the second reflective surface 206 of the second reflector 205d prior to reflecting off the first reflective surface 219 of the first reflector 215. As demonstrated in FIGS. 2-7, the second reflector 205d that is rotatable about the second rotation axis 227 may be provided in the glass separation apparatus 149 discussed more fully above. In such embodiments, the glass separation apparatus 149 may include the option of rotating the second reflective surface 206 about the second rotation axis 227. In some embodiments, the separation apparatus may allow selection to avoid rotating of the second reflective surface 206. Avoiding rotation of the second reflective surface 206 may be desirable in applications where the glass ribbon is not moving along the length of the glass ribbon.

Alternatively, the glass separation apparatus 1449 of FIGS. 14-18 illustrate an embodiment where the first reflector 215 is positioned upstream of the second reflector 1401 such that the laser beam 203 reflects off the first reflective surface 219 of the first reflector 215 prior to reflecting off the second reflective surface 1402 of the second reflector 1401. In such an embodiment, a configuration demonstrated in FIGS. 2-7 may be used wherein all of the reflectors 205a-d do not include the ability to rotate. As such, the glass separation apparatus may be used in applications where the glass ribbon is not moving along the length of the glass ribbon. Alternatively, the second reflector 1401 may be provided in addition to allow movement of the laser beam spot in the direction of the length of the glass ribbon.

In some embodiments, the at least one laser beam generator 201 may produce a plurality of laser beam spots 209 that each produce thermal stress along a corresponding heated segment of the separation path 151. For example, as shown in FIG. 8, each of the illustrated second reflectors 205d can include a reflective surface that is rotatable about the second rotation axis 227 to allow each of the heated segments 801, 803, 805, 807, 809 to travel along the conveyance direction of the glass ribbon to continuously expose the separation path 151 to the respective laser beam spot of each laser beam.

In some embodiments, the second reflector 205d, 1401 may be provided without the first reflector 215. In such embodiments, the at least one laser beam generator may be designed to produce a single laser beam spot extending along the entire width of the glass ribbon or greater than the entire width of the glass ribbon. Alternatively, the at least one laser beam generator may produce a plurality of laser beam spots (e.g., that may optionally partially overlap one another) that together extend along the entire width of the glass ribbon or greater than the entire width of the glass ribbon. In such embodiments, a single laser beam spot traveling along the separation path is not needed since a stationary single elongated laser beam spot or a plurality of stationary laser beam spots span across the entire width of the separation path. In such embodiments, the second reflector 205d, 1401 may be provided to allow the single laser beam spot or plurality of laser beam spots to move together with the glass ribbon along conveyance direction 901 (e.g., draw direction) of the glass ribbon to continuously heat the separation path 151 even though the glass ribbon is moving along the conveyance direction 901.

Methods of separating the glass sheet 104 from the glass ribbon 103 will now be described. The method includes the step of moving the glass ribbon 103 in a direction of the length of the glass ribbon. In some embodiments, the glass ribbon 103 may be moved, such as unwound, from a spool of glass ribbon previously produced wherein the unwound portion of the glass ribbon travels along the length of the glass ribbon. In such an embodiment, the spool of glass ribbon may be unwound wherein the glass sheet may be separated from the glass ribbon without interruption of the process of unwinding the glass ribbon from the spool of glass ribbon. Furthermore, the illustrated embodiment of the glass ribbon 103 is shown being moved in a conveyance direction 901 (e.g., draw direction) such as in a direction of gravity wherein the draw direction is the same direction as the direction of the length of the glass ribbon and the conveyance direction of the glass ribbon. In alternative embodiments, the glass ribbon may be moved at an angle or even along a direction perpendicular to gravity. Indeed, the glass ribbon 103 may be traveling horizontally along the length of the glass ribbon, for example on air bars, during transport and/or during processing of the glass ribbon. In such embodiments, the glass sheet 104 may be separated from the glass ribbon 103 as the glass ribbon travels in a lateral (e.g., horizontal) conveyance direction.

The method can further include exposing the separation path 151 on the glass ribbon 103 to at least one laser beam spot 209 to produce thermal stress along the separation path 151 without damaging the glass ribbon 103. The separation path 151 is considered the path on the first major surface 213 where separation will occur, for example, by a full body crack spontaneously forming along the separation path and through the entire thickness of the glass ribbon from the first major surface of the glass ribbon to the second major surface of the glass ribbon in response to the creation of the defect discussed more fully below. The separation path 151 can extend in a direction of the width "W" of the glass ribbon. For example, the separation path may optionally be perpendicular to the length "L1" such that the resultant directional vector of the separation path 151 is identical to the resultant directional vector of the width "W" of the glass ribbon. In such an embodiment, separation may result in the glass ribbon including a separated edge extending along the separation path that is perpendicular to the outer edges 153, 155 of the glass ribbon 103 (i.e., outer edges 153, 155 that are parallel to one another). Alternatively, the separation path may be at an angle other than perpendicular to length "L1" wherein the resultant directional vector of the separation path 151 is not identical to the resulting directional vector of the width "W" of the glass ribbon. In such an embodiment, separation may result in the glass ribbon including a separated edge extending along the separation path that is at an acute angle relative to one of the outer edges 153, 155 (i.e., parallel outer edges 153, 155) and an obtuse angle relative to the other of the parallel outer edges 153, 155.

As shown in the drawings and discussed above, the method can include intersecting the at least one laser beam 203 at a corresponding laser beam spot 209 on a major surface, such as the first major surface 213, of the glass ribbon 103. The method can include repeatedly passing the laser beam spot 209 along the separation path 151 in the direction 225 of the width "W" of the glass ribbon 103 to produce thermal stress along the separation path 151. In some embodiments, the laser beam spot 209 may travel in a single direction (e.g., in the direction 225) in a direction from the first outer edge 153 toward the second outer edge 155 of the glass ribbon 103 without traveling in an opposite direction from the second outer edge 155 to the first outer edge 153 of the glass ribbon 103.

Exemplary methods can include reflecting the at least one laser beam 203 off the first reflective surface 219 of a first reflector 215 rotating about the first rotation axis 218 to cause the laser beam spot 209 to repeatedly pass along the separation path 151 in the direction 225 of the width "W" of the glass ribbon 103. As discussed above, the first reflector 215 may comprise a polygonal reflector that rotates to cause the laser beam spot 209 to travel in the single direction 225.

Methods of the disclosure can further include the step of moving the laser beam in the conveyance direction 901 (e.g., draw direction, direction of the length "L1" of the glass ribbon 103, etc.) such that the laser beam travels together with the glass ribbon 103. As such, the separation path 151 continues to be exposed to the laser beam to continue producing thermal stress along the separation path 151 while the glass ribbon 103 moves in the conveyance direction 901.

Such movement of the laser beam in the conveyance direction 901 can be carried out in any of the above embodiments, where the glass ribbon 103 is heated along the entire width "W" of the glass ribbon 103. For example, such movement of the laser beam can be provided in embodiments where the laser beam generator provides a single stationary laser beam or a plurality of laser beams (and their respective laser beam spots) that are stationary and overlap one another. In further embodiments, such movement of the laser beam in the conveyance direction 901 can include embodiments that also include repeatedly passing the laser beam spot 209 or a plurality of laser beam spots (see FIG. 8) along the separation path 151. In such embodiments, the method includes the step of moving the laser beam spot in the conveyance direction 901 such that the laser beam spot 209 travels together with the glass ribbon 103 while the laser beam spot 209 continues to repeatedly pass along the separation path 151 in the direction of the width "W" of the glass ribbon 103 to continue producing the thermal stress along the separation path 151.

As shown in the embodiments of FIGS. 9-13 and FIGS. 14-18, the methods can include reflecting the at least one laser beam 203 off the rotating reflective surface 206, 1402 to cause the laser beam to move in the conveyance direction 901 (e.g., draw direction) such that the laser beam travels together with the glass ribbon. In such a way, each embodiment of FIGS. 9-13 and FIGS. 14-18 produces thermal stress along the separation path 151 even while the separation path 151 is moving in the direction 901.

Figure 9:
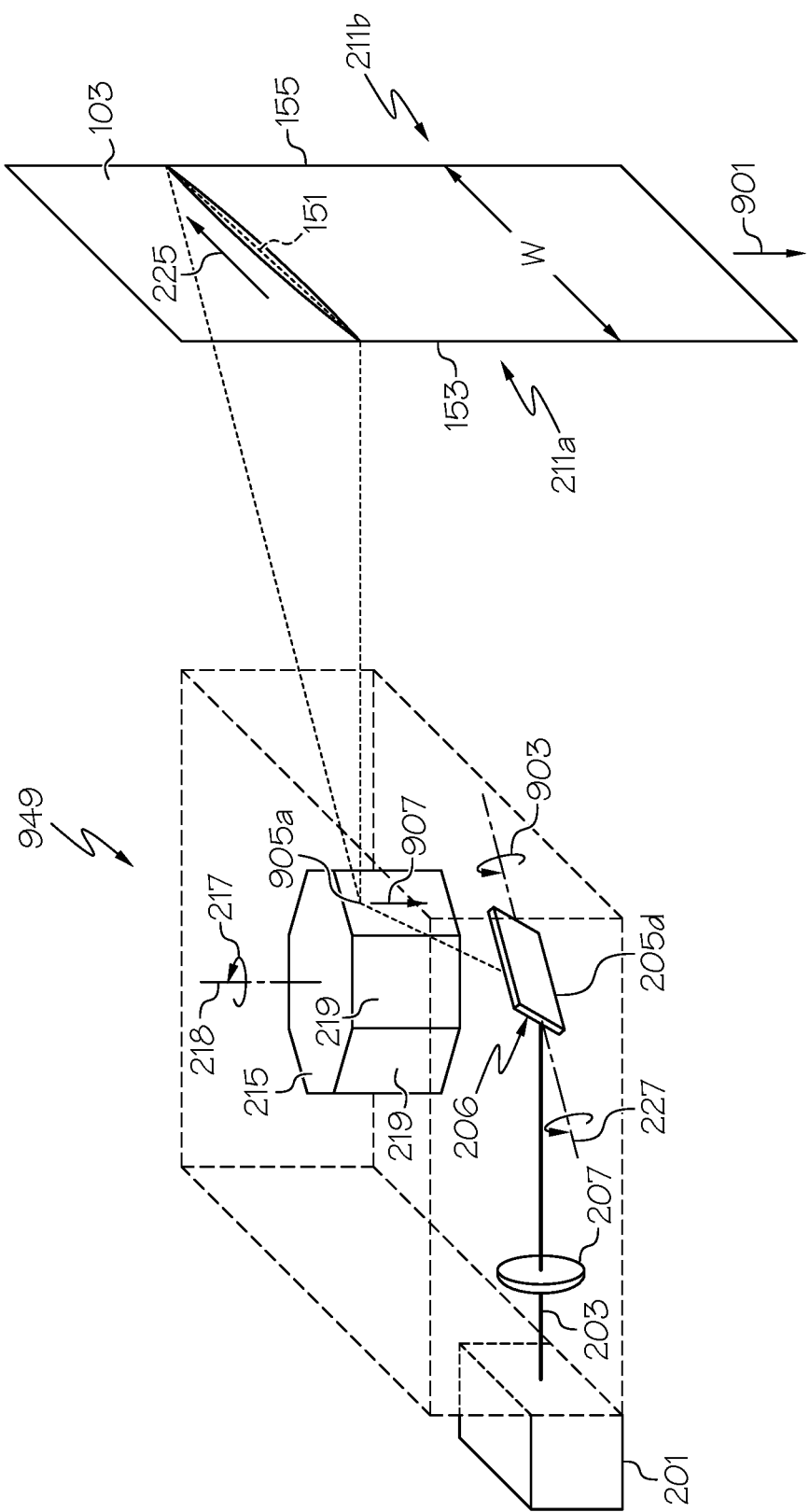
FIG. 9 is a perspective schematic view of an apparatus exposing a separation path on the glass ribbon at an upstream location.

By way of illustration, embodiments of producing thermal stress along the separation path 151 by way of the apparatus illustrated in FIGS. 9-13 will be discussed. Referring initially to FIG. 9, a laser beam 203 produced by the laser beam generator 201 may pass through one or more optical lenses 207 to produce a laser beam spot with a desired shape. The laser beam 203 then reflects off the second reflective surface 206 before the first reflective surface 219 at a first rotational position relative to the second rotation axis 227. While in the first rotational position shown in FIG. 9, the second reflective surface 206 reflects the laser beam 203 to intersect the first reflective surface 219 at a first location 905a. The laser beam then reflects off the first reflective surface 219 from the first location 905a to intersect the separation path 151 at a lateral location on the separation path dependent upon the rotational position of the first reflector 215 relative to the first rotation axis 218 as discussed above. Indeed, when using the illustrated polygonal reflector as the first reflector 215, rotation of the polygonal reflector about the first rotation axis 218 in the counterclockwise direction 217 will cause the laser beam spot to travel along the separation path 151 in direction 225 from the first outer edge portion 211a toward a second outer edge portion 211b of the glass ribbon 103. As further discussed above, the step of repeatedly passing the laser beam spot can optionally include repeatedly passing the laser beam spot in a single direction (e.g., the direction 225). Repeatedly passing the laser beam spot in a single direction may help to quickly separate the glass sheet 104 from the glass ribbon 103 upon creating a defect on the separation path as discussed more fully below.

The second reflective surface 206 can be rotated (e.g., continuously rotated) at a rotational rate (e.g., a constant rotational rate) about the second rotation axis 227 such that the location of reflection off of the first reflective surface 219 travels in a direction 907, such as the illustrated direction, that is parallel to the first rotation axis 218. Moving the location of reflection in the direction 907 can help the laser beam spot 209 follow the glass ribbon in the conveyance direction 901 to allow the laser beam spot to continuously intersect with the separation path 151 while the separation path moves in the conveyance direction 901 and the direction 225 transverse (e.g., perpendicular) to the conveyance direction 901.

Figure 10:
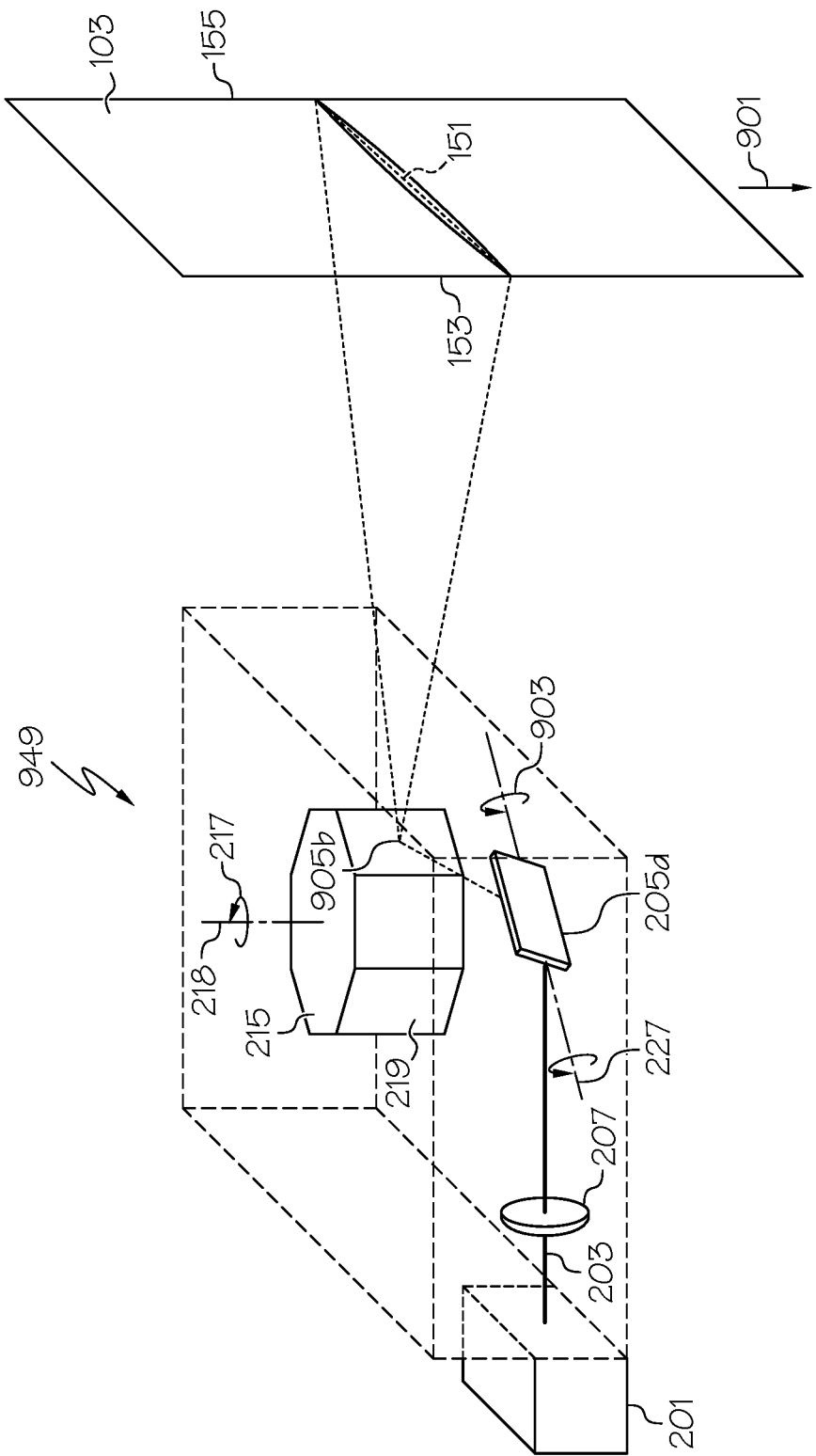
FIG. 10 is the perspective schematic view of the apparatus of FIG. 9 exposing the separation path at an intermediate location.

The second reflective surface 206 can be rotated from the first rotational position (shown in FIG. 9) about the second rotation axis 227 in direction 903 to a second rotational position (shown in FIG. 10). While in the second rotational position shown in FIG. 10, the second reflective surface 206 reflects the laser beam 203 to intersect the first reflective surface 219 at a second location 905b downstream from the first location 905a. The laser beam then reflects off the first reflective surface 219 from the second location 905b to intersect the laser beam spot 209 with the separation path 151 that has moved downstream in direction 901 compared to the position of the separation path 151 shown in FIG. 9.

Figure 11:
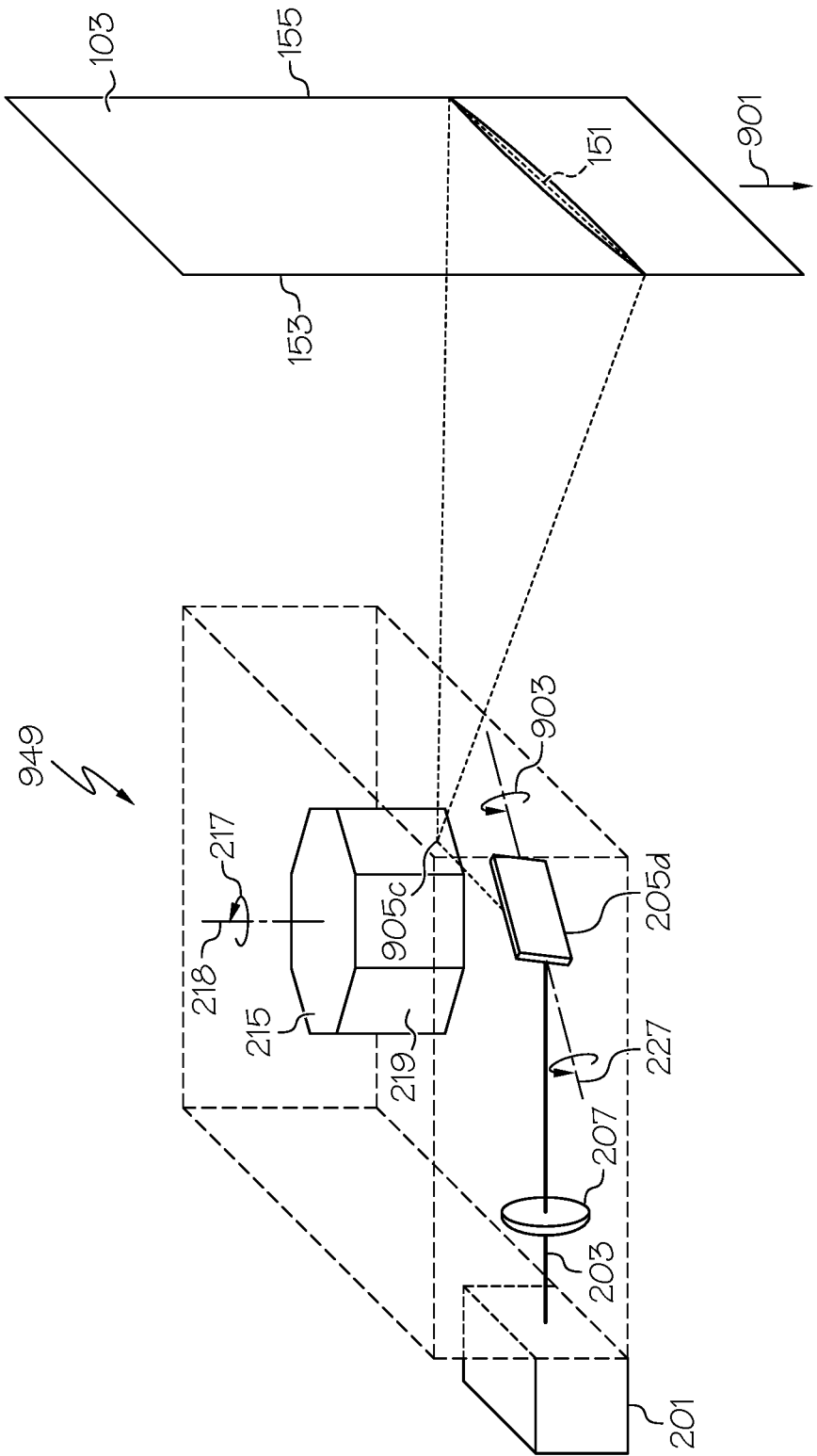
FIG. 11 is the perspective schematic view of the apparatus of FIG. 9 exposing the separation path at a downstream location.

The second reflective surface 206 can be still further rotated from the second rotational position (shown in FIG. 10) about the second rotation axis 227 in direction 903 to a third rotational position (shown in FIG. 11). While in the third rotational position shown in FIG. 11, the second reflective surface 206 reflects the laser beam 203 to intersect the first reflective surface 219 at a third location 905c downstream from the second location 905b. The laser beam then reflects off the first reflective surface 219 from the third location 905c to intersect the laser beam spot 209 with the separation path 151 that has moved downstream in direction 901 compared to the position of the separation path 151 shown in FIG. 10.

As can be appreciated, although FIGS. 9-11 show incremental movements of the second reflective surface 206 and incremental positions of the separation path 151, the movement of the second reflective surface 206 can be rotated continuously about the second rotation axis 1403 to cause the laser beam spot 209 to continuously intersect with the separation path 151 as the separation path moves in the direction of the length of the glass ribbon.

Figure 14:
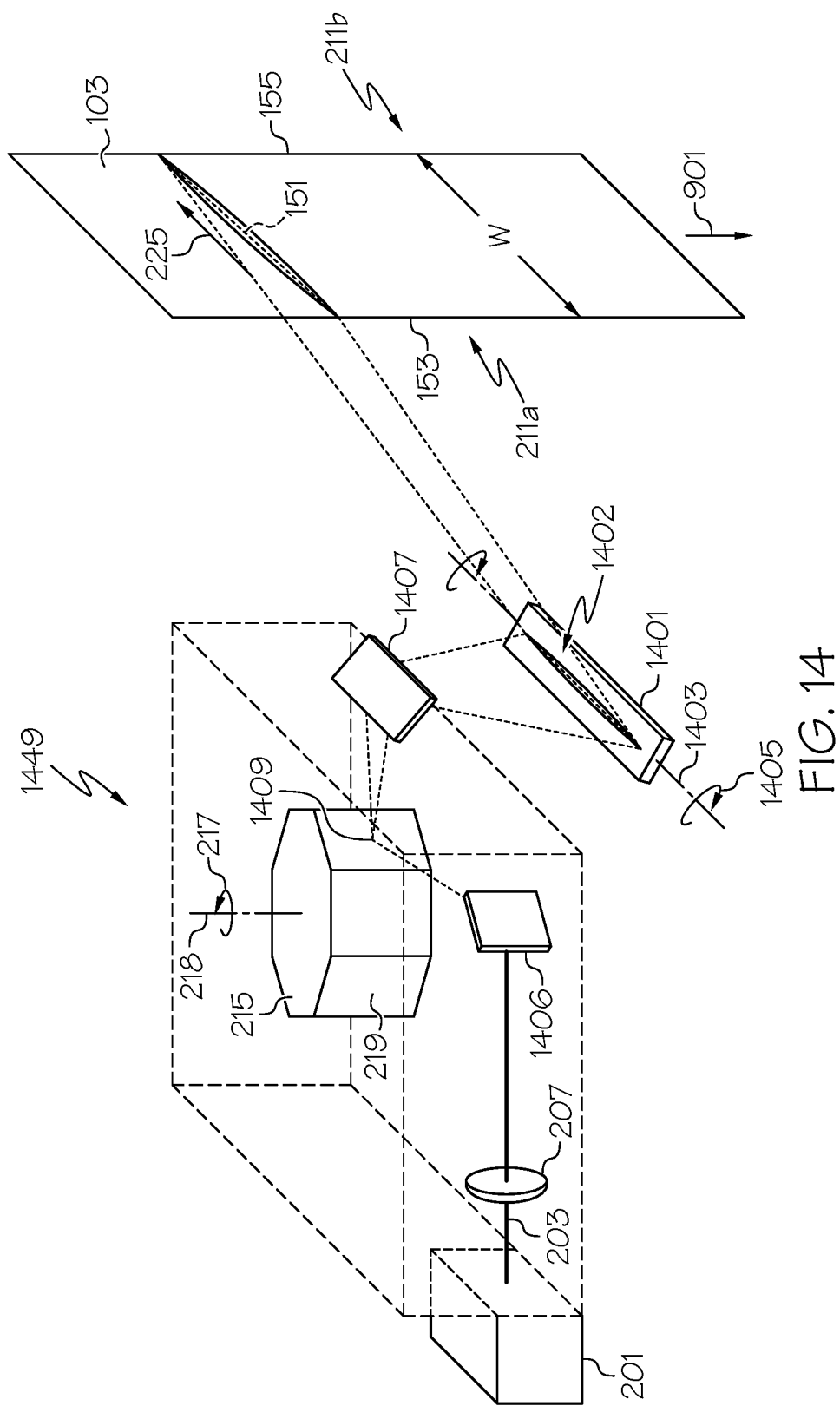
FIG. 14 is a perspective schematic view of another apparatus exposing a separation path on the glass ribbon at an upstream location.

Embodiments of producing thermal stress along the separation path 151 by way of the apparatus illustrated in FIGS. 14-18 will now be discussed. Referring initially to FIG. 14, the laser beam 203 produced by the laser beam generator 201 may pass through one or more optical lenses 207 to produce a laser beam spot with desired shape. The laser beam 203 may then optionally reflect off of one or more stationary reflectors 1406 to intersect the first reflective surface 219 before intersecting the second reflective surface 1402. In one embodiment, the laser beam 203 intersects the first reflective surface 219 at location 1409. The laser beam may then optionally reflect off of one or more additional reflectors 1407 before reflecting off of the second reflective surface 1402 of the second reflector 1401 at a first rotational position relative to the second rotation axis 1403. While in the first rotational position shown in FIG. 14, the second reflective surface 1402 reflects the laser beam 203 to intersect the laser beam spot 209 with the separation path 151 at a lateral location on the separation path dependent upon the rotational position of the first reflector 215 relative to the first rotation axis 218 as discussed above. Indeed, when using the illustrated polygonal reflector as the first reflector 215, rotation of the polygonal reflector about the first rotation axis 218 in the counterclockwise direction 217 will cause the laser beam spot 209 to travel along the separation path 151 in direction 255 from the first outer edge portion 211a toward a second outer edge portion 211b of the glass ribbon 103. As further discussed above, the step of repeatedly passing the laser beam spot can optionally include repeatedly passing the laser beam spot in a single direction (e.g., the direction 225).

The second reflective surface 1402 can be rotated (e.g., continuously rotated) at a rotational rate (e.g., e.g., a constant rotational rate or an adjusted rotational rate) about the second rotation axis 1403 to allow the laser beam spot to continuously intersect with the separation path 151 while the separation path moves in the direction 901 of the length of the glass ribbon and the direction 225 of the width of the glass ribbon.

Figure 15:
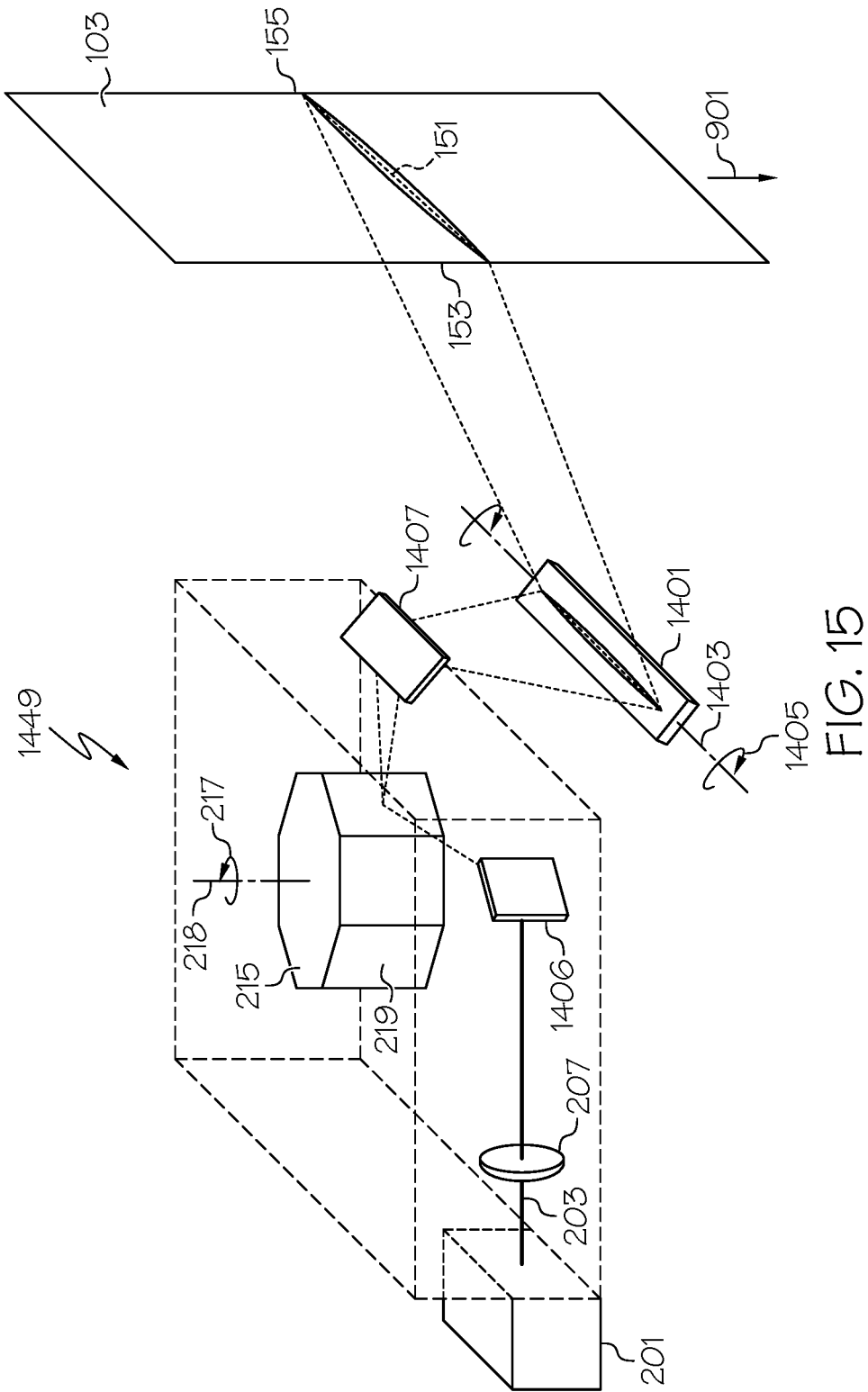
FIG. 15 is the perspective schematic view of the apparatus of FIG. 14 exposing the separation path at an intermediate location.

The second reflective surface 1402 can be rotated from the first rotational position (shown in FIG. 14) about the second rotation axis 1403 in direction 1405 to a second rotational position (shown in FIG. 15). While in the second rotational position shown in FIG. 15, the second reflective surface 1402 reflects the laser beam 203 to intersect the separation path 151 that has moved downstream in direction 901 compared to the position of the separation path 151 shown in FIG. 14.

Figure 16:
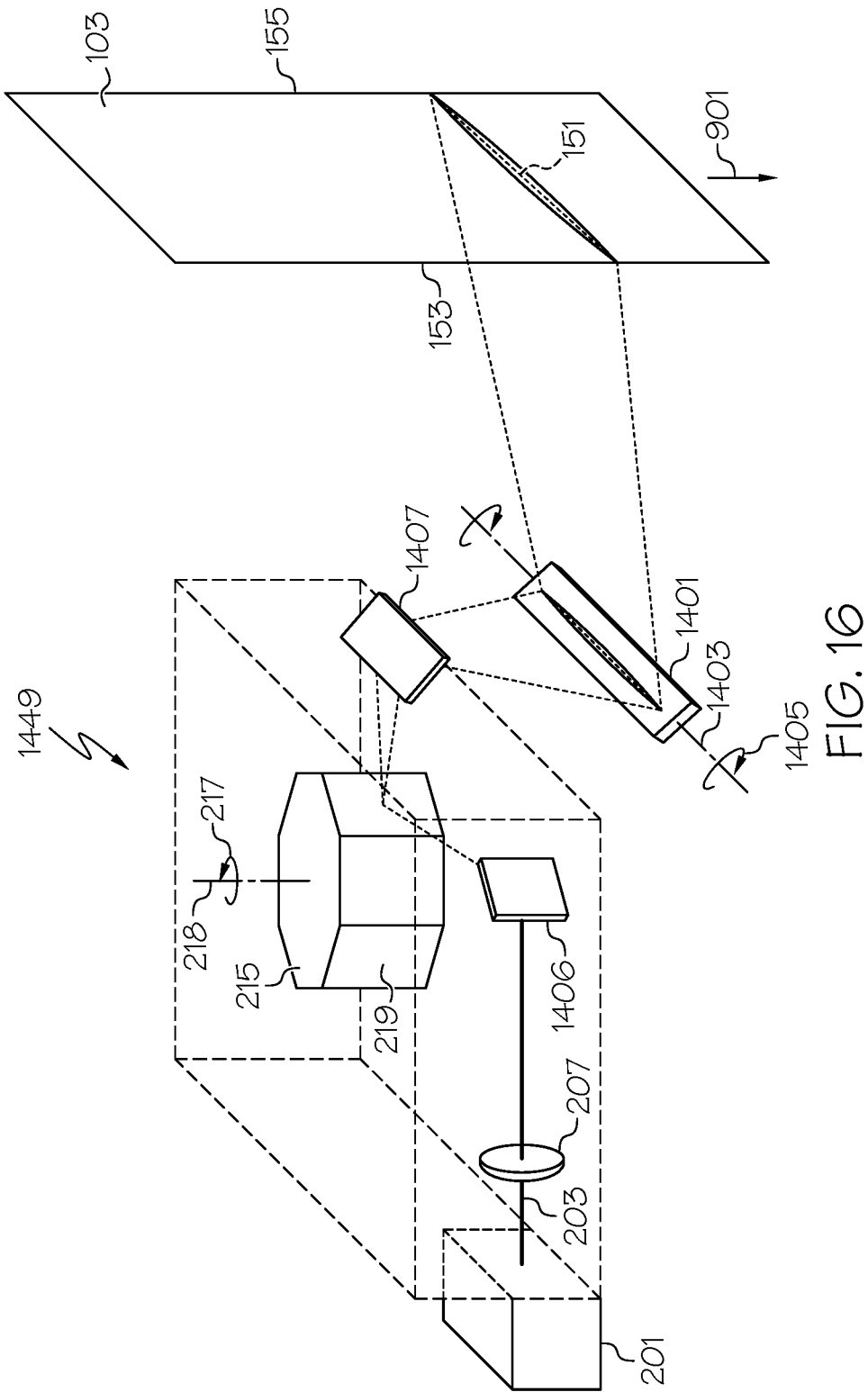
FIG. 16 is the perspective schematic view of the apparatus of FIG. 14 exposing the separation path at a downstream location.

The second reflective surface 1402 can be still further rotated from the second rotational position (shown in FIG. 15) about the second rotation axis 1403 in direction 1405 to a third rotational position (shown in FIG. 16). While in the third rotational position shown in FIG. 16, the second reflective surface 1402 reflects the laser beam 203 to intersect the laser beam spot 209 with the separation path 151 that has moved downstream in direction 901 compared to the position of the separation path 151 shown in FIG. 15.

As can be appreciated, although FIGS. 14-16 show incremental movements of the second reflective surface 1402 and incremental positions of the separation path 151, the movement of the second reflective surface 1402 can be rotated continuously about the second rotation axis 1403 to cause the laser beam spot to continuously intersect with the separation path 151 as the separation path moves in the direction of the length of the glass ribbon.

In any of the embodiments of the disclosure, rotation of the second reflective surface 206, 1402 can be coordinated with the velocity of the glass ribbon in the conveyance direction 901 (e.g. in the draw direction) such that the laser beam spot continuously intersects the separation path 151 as the separation path moves along the conveyance direction. For example, the second reflective surface 206, 1402 may be manually rotated about the second rotational axis. In further embodiments, an actuator (not shown) may be used to rotate the second reflective surface 206, 1402 at a continuous predetermined rotational speed to cause the laser beam spot to continuously intersect the separation path 151 as it moves in the direction of the length and as the laser beam spot moves along the direction 225. Still further, the actuator may optionally be operated by a controller configured to obtain feedback from a sensor that senses the velocity of the glass ribbon in the direction of the length of the glass ribbon (e.g., down draw direction 901) and enters the velocity of the glass ribbon in an algorithm that calculates a target rotational rate of the second reflective surface 206, 1402 about the second rotation axis 227, 1403. The controller can then operate the actuator to rotate the second reflective surface 206, 1402 at the target rotational rate to cause the laser beam spot to continuously contact the separation path 151. In still further embodiments, sensors (e.g., thermal or optical sensors) may be employed to determine where the laser beam spot is intersecting the corresponding major surface of the glass ribbon. The controller may compare this location to the location of the separation path and operate the actuator to speed up, slow down, or maintain the current rotational rate of the second reflective surface 206, 1402 about the second rotation axis 227, 1403 such that the laser beam spot continuously intersects the corresponding major surface of the glass ribbon.

Figure 13:
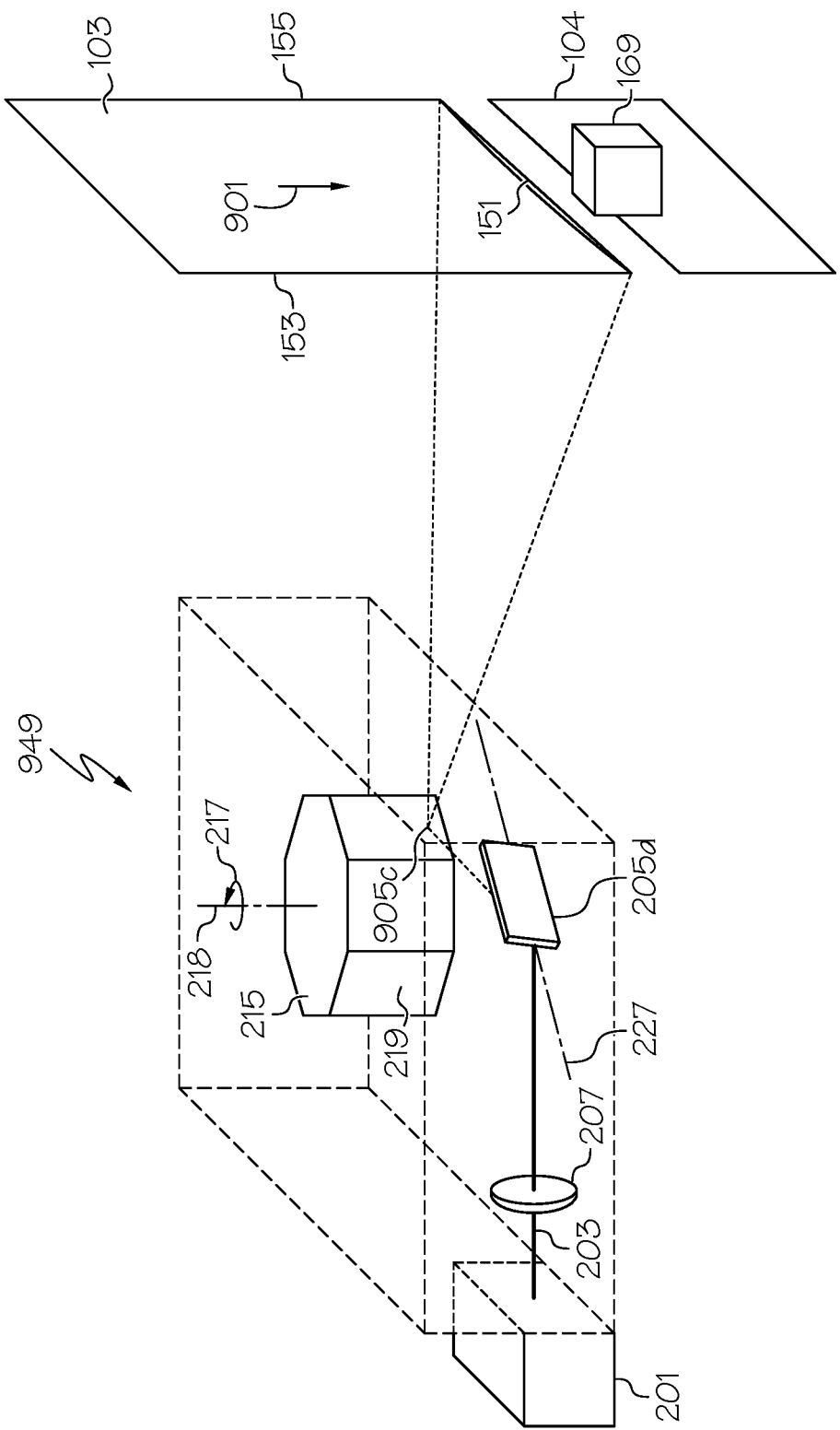
FIG. 13 is the perspective schematic view of the apparatus of FIG. 12 with the glass ribbon spontaneously separating the glass sheet from the glass ribbon along the separation path in response to the defect.
Figure 18:
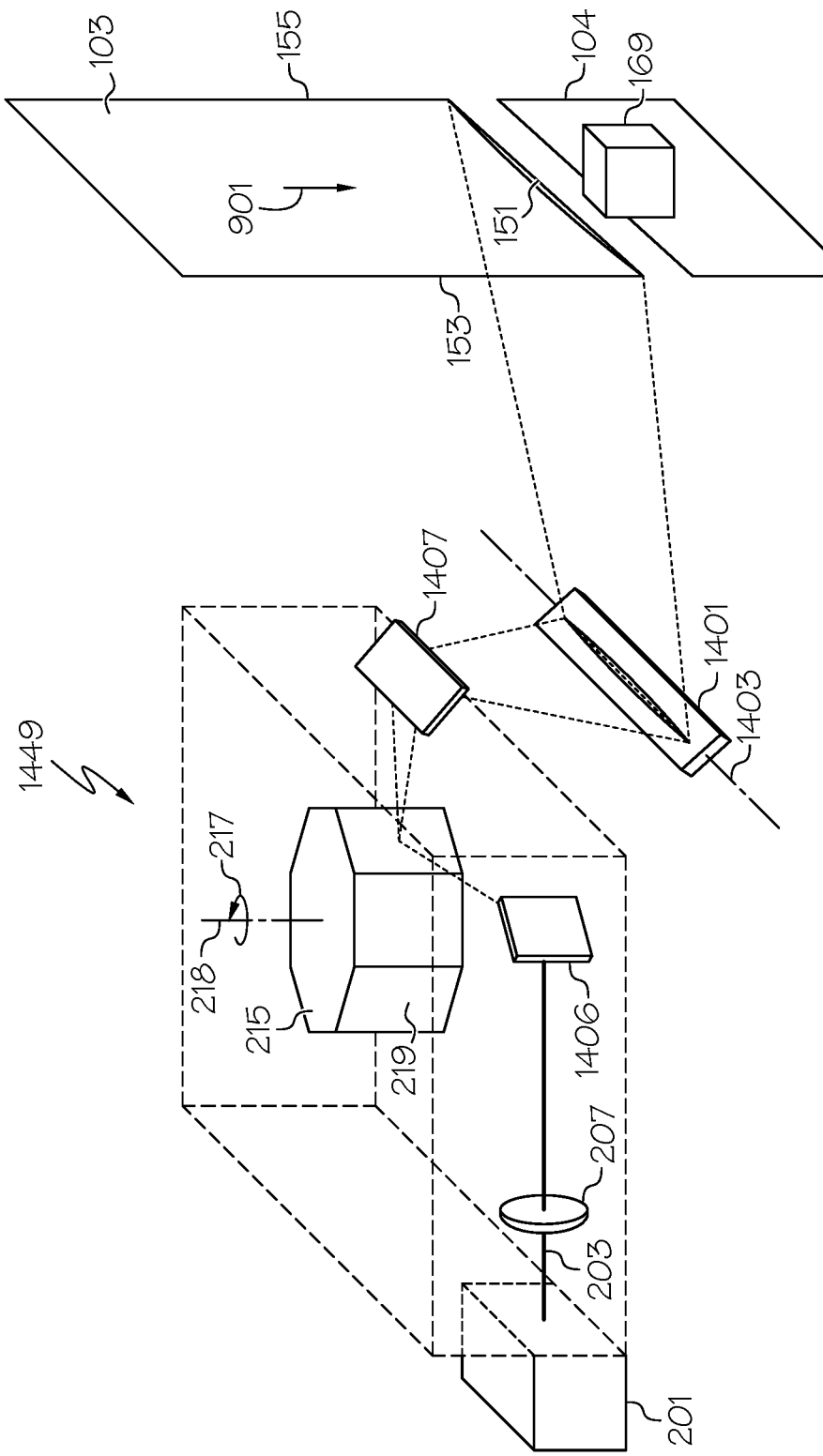
FIG. 18 is the perspective schematic view of the apparatus of FIG. 17 with the glass ribbon spontaneously separating the glass sheet from the glass ribbon along the separation path in response to the defect.

Any of the methods of the disclosure discussed above may further include the step of creating a defect 703 on the separation path 151 while the separation path is under thermal stress produced during the processes discussed above, whereupon the glass sheet 104 spontaneously separates from the glass ribbon 103 along the separation path 151 in response to the defect 703. Indeed, as shown in FIGS. 12 and 17, the method can include the step of creating the defect 703 with a laser (e.g., UV laser) while the separation path 151 is under thermal stress produced while applying thermal energy to the separation path 151 as the separation path travels in a direction of the length (e.g., draw direction 901) of the glass ribbon. Although a laser is shown for creating the defect 703, further embodiments may use a mechanical scribe (e.g., the scribe 701 discussed with respect to FIG. 1) such as a score wheel, a diamond tip or other defect generating technique. As shown in FIGS. 13 and 18, in response to the defect 703, the glass sheet 104 spontaneously separates from the glass ribbon 103 along the separation path 151.

As mentioned previously, any of the exemplary methods of the disclosure can include repeatedly passing the laser beam spot 209 in the single direction 225 from the first outer edge portion 211a to the second outer edge portion 211b. Although not required, passing the laser beam spot in the single direction can be beneficial to quickly separate the glass sheet 104 from the glass ribbon 103. For example, as shown in FIGS. 12 and 17, the defect 703 can be created closer to the first outer edge 153 than the second outer edge 155 whereupon the thermal stress profile generated by the laser beam spot 209 traveling in the single direction 225 can help propagate a full body crack in the single direction 225.

In any of the exemplary methods of the disclosure, the defect 703 may be created while the separation path 151 is being exposed to the laser beam 203 to produce the thermal stress along the separation path 151. While the defect 703 may be produced shortly after creating the thermal stress, continuing to generate or maintain the thermal stress with the laser beam along the separation path 151 while generating the defect 703 can allow the defect to be created while the separation path 151 is under maximum stress to facilitate separation of the glass sheet 104.

Furthermore, the defect 703 may be created after a predetermined level of thermal stress is achieved along the separation path during the step of heating the separation path 151. For instance, in some embodiments, thermal stress sufficient to separate a glass ribbon may be predetermined based on prior experience or calculations. Moreover, the thermal stress may be predetermined based on a predetermined time of exposing the separation path to the laser beam 203. Still further, the thermal stress may be predetermined and then the defect may be created after the predetermined level of stress is achieved. For instance, a thermal sensor (e.g., thermal camera) or other sensing device may monitor the temperature of the separation path 151. An achieved predetermined temperature of the separation path 151 can be an indicator of the achieved predetermined stress. Thus, applying the defect to the separation path 151 after a predetermined level of stress is achieved may be carried out once a predetermine temperature corresponding to that predetermined stress is achieved.

While the embodiments of FIGS. 9-13 and FIGS. 14-18 illustrate a single laser beam, further embodiments can include the use of multiple laser beams to create thermal stress along the separation path. For example, the plurality of laser beams discussed with reference to FIG. 8 may be used in the embodiments of FIGS. 9-13 and FIGS. 14-18 to allow separation of glass ribbons having a relatively larger overall width. In such embodiments, the plurality of laser beam spots can each intersect a corresponding heated segment 801, 803, 805, 807, 809, each laser beam following the separation path 151 as the separation path travels in the direction of the length of the glass ribbon. Furthermore, in some embodiments, each segment of the separation path can overlap a portion of at least one adjacent segment of the separation path (e.g., see overlapping regions 811, 813, 815, 817). Such overlapping regions can allow sufficient thermal stress to be generated along the entire separation path 151.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A method of separating a glass web comprising the steps of:
   (I) moving the glass web at a glass web velocity including a glass web velocity vector in a conveyance direction of the moving glass web;
   (II) exposing a separation path on the glass web to at least one laser beam spot to produce thermal stress along the separation path by reflecting at least one laser beam off a first reflective surface rotating about a first axis, the separation path extending in a direction transverse to the conveyance direction;
   (III) moving the laser beam spot at a laser beam spot velocity including a laser beam spot velocity vector in the conveyance direction that is equal to the glass web velocity vector by reflecting the at least one laser beam off a second reflective surface rotating about a second axis, wherein the separation path continues to be exposed to the laser beam spot to continue producing thermal stress along the separation path while the glass web moves at the glass web velocity; and
   (IV) creating a defect on the separation path while the separation path is under thermal stress produced during steps (II) and (III), whereupon the glass web separates along the separation path in response to creating the defect.

2. The method of claim 1, further including repeatedly passing the laser beam spot along the separation path in the direction transverse to the conveyance direction to produce the thermal stress along the separation path during steps (II) and (III).

3. The method of claim 2, wherein the laser beam spot velocity of step (III) includes another laser beam spot velocity vector in the direction transverse to the conveyance direction, wherein the laser beam spot moves in the conveyance direction and the direction transverse to the conveyance direction such that the separation path continues to be exposed to the laser beam spot to continue producing thermal stress along the separation path while the glass web moves at the glass web velocity and while the laser beam spot continues to repeatedly pass along the separation path in the direction transverse to the conveyance direction.

4. The method of claim 2, wherein the step of repeatedly passing the beam spot includes repeatedly passing the beam spot in a single direction transverse to the conveyance direction.

5. The method of claim 4, wherein the single direction comprises a direction extending from a first edge toward a second edge of the glass web, and wherein the defect is created closer to the first edge than the second edge.

6. The method of claim 1, wherein the at least one laser beam reflects off the first reflective surface before the second reflective surface.

7. The method of claim 1, wherein the at least one laser beam reflects off the second reflective surface before the first reflective surface.

8. The method of claim 1, wherein the first axis is perpendicular to the second axis.

9. The method of claim 1, wherein step (IV) is performed while step (III) is performed.

10. The method of claim 1, wherein step (IV) is performed after a predetermined level of thermal stress is achieved along the separation path during step (III).

11. The method of claim 1, wherein the at least one laser beam spot of step (I) comprises a plurality of laser beam spots that are each reflected from a different reflective surface rotating about a respective rotational axis, and produce thermal stress along a corresponding segment of the separation path during steps (II) and (III).

12. The method of claim 11, wherein each segment of the separation path overlaps a portion of at least one adjacent segment of the separation path.

13. The method of claim 1, wherein the defect of step (IV) is created with a laser or by mechanically engaging the glass web.

14. The method of claim 1, wherein the glass web includes a length and a width extending between a first edge and a second edge of the glass web, and the conveyance direction is a direction of the length of the glass web.

15. The method of claim 1, wherein the glass web comprises a glass ribbon drawn from a forming body, and the conveyance direction is a draw direction of the glass ribbon.

* * * * *